United States Patent
Zhu

(10) Patent No.: US 8,346,641 B2
(45) Date of Patent: *Jan. 1, 2013

(54) METHOD AND SYSTEM OF AGGREGATING CONSIDERATION ASSOCIATED WITH A REQUEST

(75) Inventor: Jiafeng Zhu, San Ramon, CA (US)

(73) Assignee: Jiafeng Zhu, Pleasanton, CA (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/793,268

(22) Filed: Jun. 3, 2010

(65) Prior Publication Data

US 2010/0268642 A1   Oct. 21, 2010

Related U.S. Application Data

(63) Continuation-in-part of application No. 11/950,072, filed on Dec. 4, 2007, now Pat. No. 7,848,982.

(51) Int. Cl.
*G06Q 40/00* (2012.01)
(52) U.S. Cl. .................... 705/35; 705/12; 705/14.16
(58) Field of Classification Search .................. 705/35, 705/36 R, 37, 38, 39, 40, 41, 42
See application file for complete search history.

(56) References Cited

U.S. PATENT DOCUMENTS

| 6,064,986 A * | 5/2000 | Edelman ............. 705/36 R |
| 6,526,404 B1 * | 2/2003 | Slater et al. ............. 707/728 |
| 2006/0165060 A1 * | 7/2006 | Dua ............. 370/352 |

* cited by examiner

*Primary Examiner* — Muriel Tinkler

(57) ABSTRACT

In one embodiment, a method includes generating a request of an entity based on a set of attributes provided by an initiating patron of the entity using a processor of an initiator device. The method also includes associating an aggregation environment to the request. The method further includes allocating an initial consideration to the aggregation environment from the initiating patron. In addition, the method includes allocating, to the initial consideration, an additional consideration provided when a different patron contributes the additional consideration to the aggregation environment of the request using a processor of a supporter device. The method also includes allocating the consideration of the initiating patron and the different patron to the aggregation environment of the request to increase a value of the request to the entity in order to increase a possibility of the entity to respond to the request using a processor of an entity device.

21 Claims, 20 Drawing Sheets

| REQUEST ID 302 | REQUEST TITLE 304 | TASK 306 | TOTAL CONSIDERATION 308 | INITIATOR 310 | ENTITY 312 | REQUEST CLOSE DEADLINE 314 | NUMBER OF PATRONS 316 | TYPE (PUBLIC/ PRIVATE) 318 | CATEGORY 320 |
|---|---|---|---|---|---|---|---|---|---|
| 1001 | QUESTION BOB SMITH | QUESTION | $70000 | MICHAEL LEE | BOB SMITH | 7/1/2008 | 1000 | PUBLIC | SPORTS |
| • | • | • | • | • | • | • | • | • | • |
| • | • | • | • | • | • | • | • | • | • |
| • | • | • | • | • | • | • | • | • | • |

350

MIKE SMITH IS REQUIRED TO ANSWER QUESTIONS

| | | |
|---|---|---|
| REQUEST ID: | A101145 | ~ 600 |
| INITIATOR: | CHRIS BOB | ~ 602 |
| MONEY POOL SIZE: | US $100 ~ 604 | |
| PATICIPATED REQUEST USERS: | 21 ~ 606 | |
| MINIMAL CONTRIBUTE UNIT: | US $1 ~ 608 | |
| ACCEPTING DEADLINE: | END AT AUGUST 10 2008 11:55AM (PDT) ~ 610 | |
| ALLOW ADDITIONAL TASKS: | YES ~ 612 | |
| ALLOW FULFILL LESS TASKS: | YES ~ 614 | |
| ADD TASK DEADLINE: | AUGUST 5 2007 11:55 AM (PDT) ~ 616 | |
| FULFILL DEADLINE: | 5 DAYS AFTER ACCEPT ~ 618 | |
| VERIFICATION METHOD: | VERIFY BY VOTE BY OFFER MEMBERS, >50% PASS AS VERIFIED ~ 620 | |
| VERIFICATION DEADLINE: | 5 DAYS AFTER FULFILL ~ 621 | |
| REDO ALLOW: | 1 TIME ~ 622 | |

TASKS:

TASK 1: MIKE SMITH IS REQUIRED TO ANSWER THE FOLLOWING QUESTION DETAIL DESCRIPTIONS...

[                    ] ~ 624

(ENTER) (CLEAR) (UPLOAD IMAGES OR VIDEO CLIPS)

TASK 2: MIKE SMITH IS REQUIRED TO ANSWER THE FOLLOWING QUESTION DETAIL DESCRIPTIONS...

[                    ] ~ 626

(ENTER) (CLEAR) (UPLOAD IMAGES OR VIDEO CLIPS) ~ 628

FIGURE 6A

~ 650A

CHRIS BOB REQUEST COMMUNITY

REQUEST ~ 630

1     MIKE SMITH TO PERFORM CONCERT ~ 631
2     <u>JERRY TO SHOW MIND GAMES</u>
3     <u>MARK TO TRAIN STRATEGY</u>
4     <u>SUSAN FOR FASHION ADVICE</u>

MIKE SMITH TO PERFORM CONCERT ~ 632

| | |
|---|---|
| REQUEST ID: | A101145 |
| RESPONDENT: | MIKE SMITH ~ 633 |
| INITIATOR: | CHRIS BOB |
| MONEY POOL SIZE: | US $100 |
| PARTICIPATED REQUEST USERS: | 21 |
| MINIMAL CONTRIBUTE UNIT: | US $1 |
| ACCEPTING DEADLINE: | END AT AUGUST 10 2008 11:55AM (PDT) |
| TASK DEADLINE: | BEFORE AUGUST 5 2007 11:55 AM (PDT) |
| FULFILL DEADLINE: | 5 DAYS AFTER ACCEPT |
| TYPE OF REQUEST: | PUBLIC ~ 634 |
| VERIFICATION: | NO ~ 635 |
| MY CONSIDERATION: | [ ] ~ 636 |

TASKS: ~ 638

TASK 1:

[ ENTER ]   [ CLEAR ]   [ SUBMIT ]

TASK 2:

[ ENTER ]   [ CLEAR ]   [ SUBMIT ]

[ ADD MORE TASKS ] ~ 640

FIGURE 6B     ~ 650B

SELECT A VERIFICATION METHOD

○ VERIFY BY INITIATOR ONLY ~702

○ VERIFY BY THIRD PARTY ~704

THIRD PARTY NAME
THIRD PARTY EMAIL
THIRD PARTY ADDRESS

○ VERIFY BY VOTE
    ○ ONE VOTE PER MONEY POOL MEMBER
    ○ ONE VOTE PER DOLLAR OF MONEY POOL MEMBER ~706
    VOTE THRESHOLD

PATRON ~906A

OPEN OFFERS ~902A

| RESPONDENT ENTITY | TITLE | MONEY POOL SIZE | PARTICIPATED PATRONS | ENDING TIME | ADD MONEY | ADD TASK | VERIFY |
|---|---|---|---|---|---|---|---|
| JOE SMITH | JOE SMITH IS REQUIRED TO PERFORM SING A SONG | $999 | 100 | 30 DAYS, 11 HOURS, 5 MINUTES | ADD $ | O | O |
| MIKE YOUNG | MIKE YOUNG IS REQUIRED TO ANSWER QUESTIONS | $919 | 201 | 3 DAYS, 11 HOURS, 15 MINUTES | ADD $ | O | O |
| ANN ROB | ANN ROB IS REQUIRED TO DO AN ONLINE INTERVIEW | $99 | 10 | 4 DAYS, 1 HOURS, 5 MINUTES | CLOSED | O | O |

OFFER HISTORY ~904A

| RESPONDENT ENTITY | TITLE | MONEY POOL SIZE | PARTICIPATED PATRONS | ENDING TIME | STATUS | VIEW RESULTS |
|---|---|---|---|---|---|---|
| PETER JOE | PETER JOE IS REQUIRED TO PERFORM SING A SONG | $999 | 100 | JULY 30TH 2007 11:08AM (PDT) | REFUND | O |
| MARY RICE | MARY RICE IS REQUIRED TO ANSWER QUESTIONS | $919 | 201 | JUNE 2ND 2007 5:09AM (PDT) | PAID | O |

ENTITY ~ 906B

OPEN OFFERS ~ 902B

| TITLE | TOTAL MONEY POOL | PARTICIPATED PATRONS | ENDING TIME | SET ACCEPT THRESHOLD | ACCEPT | FULFILL | SELECT PAYMENT METHOD |
|---|---|---|---|---|---|---|---|
| JOHN SMITH IS REQUIRED TO PERFORM SING A SONG | $999 | 100 | 30 DAYS, 11 HOURS, 5 MINUTES | $ ☐ ○ VISIBLE | ○ | ○ | ○ |
| JOHN SMITH IS REQUIRED TO ANSWER QUESTIONS | $419 | 201 | 3 DAYS, 11 HOURS, 15 MINUTES | $ ☐ ● VISIBLE | ○ | ○ | ○ |
| JOHN SMITH IS REQUIRED TO DO AN ONLINE INTERVIEW | $750 | 500 | 4 DAYS, 1 HOURS, 5 MINUTES | ACCEPTED | ○ | ○ | ○ |
| JOHN SMITH IS REQUIRED TO DO AN ONLINE INTERVIEW | $999 | 889 | 4 DAYS, 1 HOURS, 5 MINUTES | ACCEPTED | ○ | ○ | ○ |

OFFER HISTORY ~ 904B

| TITLE | MONEY POOL SIZE | PARTICIPATED PATRONS | ENDING TIME | STATUS | VIEW RESULTS |
|---|---|---|---|---|---|
| JOHN SMITH IS REQUIRED TO PERFORM SING A SONG | $99 | 10 | JULY 30TH 2007 11:08AM (PDT) | REFUND | ○ |
| JOHN SMITH IS REQUIRED TO ANSWER QUESTIONS | $929 | 203 | JUNE 2ND 2007 5:09AM (PDT) | PAID | ○ |

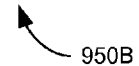

| TOP CONSIDERATION POOL ▼ | 10 ▼ | ALL CATEGORIES ▼ | BROWSE |

| RESPONDENT ENTITY | REQUEST TITLE | CONSIDERATION | PARTICIPATED USERS | ACCEPTING DEADLINE |
|---|---|---|---|---|
| JOHN SMITH | JOHN SMITH IS REQUIRED TO PERFORM SING A SONG | $999,000 | 10001 | 30 DAYS, 11 HOURS, 5 MINUTES |
| MIKE YOUNG | MIKE YOUNG IS REQUIRED TO ANSWER QUESTIONS | $919,000 | 22001 | 3 DAYS, 11 HOURS, 15 MINUTES |
| ANN ROB | ANN ROB IS REQUIRED TO DO AN ONLINE INTERVIEW | $99,000 | 1000 | 4 DAYS, 11 HOURS, 5 MINUTES |
|  |  |  |  |  |

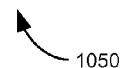
— 1050

FIGURE 10

METHOD AND SYSTEM OF AGGREGATING CONSIDERATION ASSOCIATED WITH A REQUEST

CLAIM OF PRIORITY

This is a continuation in part application and claims priority from U.S. utility application Ser. No. 11/950,072 titled "METHOD AND SYSTEM OF AGGREGATING CONSIDERATION ASSOCIATED WITH A REQUEST" filed on Dec. 4, 2007.

FIELD OF TECHNOLOGY

This disclosure relates generally to the technical fields of software and database technology and, in one example embodiment, to a method and system of aggregating consideration associated with a request.

BACKGROUND

An entity (e.g., an individual, a business, an organization, etc.) may achieve sufficient recognition (e.g., reputation, ranking, fame among a targeted audience, etc.) that demands on their time are constrained by the number of hours in a day. A patron (e.g., a follower, an observer, a fan, an employee, a family member etc.) of the entity may desire to communicate a request to the entity. For example, the patron (e.g., may be a person who supports the entity with money, gifts, efforts, and/or endorsements, etc.) may wish for the entity (e.g., may be an artist, writer, museum, charity, institution, etc.) to perform an activity with them (e.g., share a meal, interview online), prepare an article for them (e.g., write a letter, draw a picture, create a sculpture, etc.), undertake a performance for them (e.g., video record a message), and/or achieve a desired goal (e.g., reduce pollution in automobiles), answer questions, etc.

The patron may not have access to the entity because the patron may not have personal contacts to submit the request. Even when the request is submitted (e.g., through postal mail and/or through a website of the entity), the request may not be responded to because it may be difficult for the entity to determine a value and priority of the request in light of opportunities and/or requests submitted by others. For example, the entity may be inundated with requests submitted through a variety of offline (e.g., postal mail, face to face, etc.) and/or online (e.g., a website of the entity).

Furthermore, the patron may not be able to provide sufficient consideration (e.g., something of value provided by the patron to the entity, such as money, goods, services, etc.) that would make the request to compel a candidate for response. As a result, the entity may miss out on considering compelling requests because fewer requests may be submitted.

SUMMARY

Disclosed are a system, a method and an apparatus of method and system of aggregating consideration associated with a request. In one aspect, a method includes generating a request of an entity based on a set of attributes provided by an initiating patron of the entity using a processor of an initiator device. The method also includes associating an aggregation environment to the request. In addition, the method includes allocating an initial consideration to the aggregation environment from the initiating patron. The method further includes allocating, to the initial consideration, an additional consideration provided when a different patron contributes the additional consideration to the aggregation environment of the request using a processor of a supporter device. The method also includes allocating the consideration of the initiating patron and the different patron to the aggregation environment of the request to increase a value of the request to the entity in order to increase a possibility of the entity to respond to the request using a processor of an entity device.

The method may further include providing an alert and an update of a size of the aggregation environment to the entity. The method may also include receiving an interest of an acceptance by the entity after considering the size of the aggregation environment. The consideration may be one or more of a monetary unit, a credit, a point, a tangible asset, an intangible asset, a valuable good. The initiator device, the supporter device, and the entity device may be a mobile device, a cell phone, a computer, and/or a network enabled device. The aggregation environment may be one or more of a money pool, a credit pool, a point pool, a pool of valuable good, a pool of tangible good, and a pool of intangible good.

In addition, the method may include contributing to the aggregation environment using one or more of a patron billing system, a patron credit system, a patron money system, a patron point system, and a patron tangible good, a patron intangible good and a patron valuable good collection. The method may also include generating a notification to the entity of the request when the initial consideration and the additional consideration exceed a threshold value preferred by the entity. The method may include determining the initial consideration and the additional consideration through one or more accounts funded through a subscription service and/or a trusted financial intermediary.

Furthermore, the method may further include processing a response of the entity to the request. The method may also include providing a verification interface to the initiating patron and the different patron based on the initiating patron specified criteria prior to the response of the entity. The method may also include allocating the initial consideration and the additional consideration after a fulfillment of the request to the entity based on the verification result. In addition, the method may include setting the criteria as a weighted preference based on consideration provided to the request, and/or an equal preference based on a number of patrons providing any consideration to the request. The method may also include storing a voting record in the profile of the initiating patron and the different patron. The method further may include arbitrating disputes between patrons and/or the entity by involving a neutral third party. The method may also include automatically accepting the request on behalf of the entity when the threshold value may be exceeded.

The method may include designating the initial consideration and the additional consideration to be allocated based on a preference of the entity. The method may also include enabling the initiating patron and the different patron to provide the entity a feedback to the response. The entity may be an individual, a group, a business, a celebrity, and/or an organization. The request may be a performance request, a task request, a job request, an article request, a charitable request, an interview, a question to answer, an invitation, a self promotion, a donation request, a mission, and/or an altruistic request.

Furthermore, the method may include enabling the initiating patron and/or the different patron to create and/or submit multiple requests to the entity. The method may also include grouping the request and the multiple requests in categories searchable in any number of dimensions. In addition, the method may include enabling the initiating patron and the different patron to allocate tasks to the request based on a set of permissions authorized by the initiating patron.

The method may further include setting a minimum pledge amount and a set of deadlines to the request may be based on the set of permissions. The method may also include accepting additional information associated with the request and a response to the request by the entity in any multimedia format. The set of deadlines may include one or more of a deadline to provide the additional consideration, a deadline to add additional requests when the initiating patron provides for this ability, a deadline to accept the request, a deadline to fulfill the request after accepting, and a deadline to verify the response of the request.

The method may include enabling patrons to designate and search may be interest in profiles of the patrons and the entities. The method may also include customizing a set of requests individually displayed to the patrons may be based on interest provided in the profiles of the patrons. In addition, the method may also include forming a group of patrons. The group may be a private group accessible only by invitees and a public group that may be subscribed to by any user. The method may further include enabling the initiating patron to submit a private request to the entity such the private request may be shared only among invitees and the entity. The method may also include masking an identity of the initiating patron associated with the request from the entity.

In another aspect, a method includes generating a request of an entity based on a set of attributes provided by an initiating patron of the entity using a processor of an initiator device. The entity may be an individual, a group, a business, a celebrity, and an organization. The request may be a performance request, a task request, a job request, an article request, a charitable request, an interview, a question to answer, an invitation, a self promotion, a donation request, a mission, and an altruistic request. The method also includes associating an aggregation environment to the request.

The method further includes enabling the initiating patron to submit the request and allocating initial consideration to the entity in the request aggregating environment. The method also includes enabling the different patron to contribute the additional consideration to the entity in the request aggregating environment using a processor of a supporter device.

In another aspect, a system includes an aggregation environment to manage a pooled consideration associated with each one of a set of requests generated by users to one or more of a set of entities. The system further includes an initiator device to generate an initial consideration associated with the set of requests. The system also includes a supporter device to provide a supporting consideration to one or more of the set of requests funded through the initiator device. The system also includes an entity device to allow at least one of the set of entities to respond to one or more of the set of requests.

The pooled consideration and the supporting consideration may be one or more of a monetary unit, a credit, a point, a tangible asset, an intangible asset, a valuable good. The initiator device, the supporter device, and/or the entity device may be a mobile device, a cell phone, a computer, and a network enabled device. The consideration of the aggregation environment is pooled through one or more of a user billing system, a user credit system, a user money system, a user point system and a user tangible good, a user intangible good and a user valuable good collection.

In addition, the system may include a validation module of the request aggregation environment to determine whether a contact information of the entity provided through the initiator device and the supporter device references to a verified contact data, and to validate the contact information with the entity when the verified contact data is absent. The system may also include a notification and communication module of the request aggregation environment to communicate the request to the entity based on the contact information and/or the verified contact data. The system may also include a central database of the request aggregation environment to store information including the set of requests, a set of user profiles, and a set of contact data as the verified contact data. The system may also include a pledge module of the request aggregation environment to allocate the initial consideration and the additional consideration through one or more of account funded through a subscription service and a trusted financial intermediary.

Furthermore, the notification and communication module of the request aggregation environment to generate a notification to the entity of the request when the initial consideration and the additional consideration reaches an acceptable value set by the entity, and to process a response of the entity to the request. The system may also include a verification interface of the request aggregation environment to verify the response of the entity based on an initiating user specified criteria provided prior to the response of the entity to the request.

The criteria may be a weighted preference based on consideration provided to the request, an equal preference based on a number of users providing any consideration to the request, and/or a verification threshold set by the initiating user. The system may include a private module to enable generation of a private request shared only with invitees and the entity. The system may also include a public module to enable generation of a public request shared with all users of the request aggregation environment.

In addition, the system includes a dispute resolution module of the request aggregation environment may be to assign a neutral third party to arbitrate disputes between users and the entity. The system may also include a response module of the request aggregation environment to allow the entity to respond to the request and/or automatically accept the request on behalf of the entity when a threshold value preferred by the entity is exceeded. The system may further include allocating the initial consideration and the additional consideration to the entity, and to issue a refund to the users when the entity does not respond to the request or the response is rejected through the verification interface. The entity may be an individual, a group, a business, a celebrity, and an organization. The request may be a performance request, a task request, a job request, an article request, a charitable request, an interview, a question to answer, an invitation, a self promotion, a donation request, a mission, and an altruistic request.

In yet another aspect, a method includes pooling of a money and/or a credit provided by a multiple users and a distinct user to a common request to increase a value of the request to an identified respondent. The method also includes providing an interface to the multiple users and the distinct user associating a money pool to the common request. The money pool is a pool the money and/or the credit. The method further includes displaying one of the common request and the other requests to one or more of the multiple users, the distinct user and the respondent. The method also allows the identified respondent to respond to the common request through the interface.

The method may include providing a verification interface to the multiple users and the distinct user to verify and to validate a response to the common request when the respondent provides a response. In addition, the method may include designating where the money and/or the credit provided by the multiple users and distinct user to be allocated based on a preference of the respondent. The method may also include providing a refund to the multiple users and distinct user when the respondent does not respond to the request and/or when the response is rejected through the verification interface.

BRIEF DESCRIPTION OF THE DRAWINGS

Example embodiments are illustrated by way of example and not limitation in the figures of the accompanying drawings, in which like references indicate similar elements and in which:

FIG. 6A is a user interface view of a response requested of an entity, according to one embodiment.

FIG. 6B is a user interface view of requests associated with a patron, according to one embodiment.

FIG. 7 is a user interface view of selecting a verification method, according to one embodiment.

FIG. 9A is a patron view of aggregated consideration associated with requests in the request aggregation environment, according to one embodiment.

FIG. 9B is an entity view of aggregated consideration associated with requests in the request aggregation environment, according to one embodiment.

FIG. 10 is a user interface view displaying a selection of money pools associated with requests in the request aggregation environment, according to one embodiment.

Other features of the present embodiments will be apparent from the accompanying drawings and from the detailed description that follows.

DETAILED DESCRIPTION

A method and system of aggregating consideration associated with a request is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes generating a request of an entity (e.g., the entity 110 of FIG. 1, an individual, a group, private figure, a public figure, a celebrity, a business and/or an organization, etc.) based on a set of attributes (e.g., tasks) provided by an initiating patron (e.g., the initiating patron 112A of FIG. 1, a requestor, etc.) of the entity 110 using a processor of an initiator device, associating an aggregation environment (e.g., the aggregation environment 114 of FIG. 1, a money pool, a credit pool, a point pool, a pool of valuable good, a pool of tangible good, and/or a pool of intangible good, etc.) to the request, allocating an initial consideration (e.g., a monetary unit, a credit, a point, a tangible asset, an intangible asset, a valuable good, etc.) to the aggregation environment 114 from the initiating patron 112A, allocating, to the initial consideration, an additional consideration provided when a different patron (e.g., the different patron 112B of FIG. 1, a supporter, etc.) contributes the additional consideration to the aggregation environment 114 (e.g., using a pledge module 218 of FIG. 2), and allocating the consideration of the initiating patron 112A and the different patron 112B to the aggregation environment 114 of the request to increase a value of the request to the entity 110 in order to increase a possibility of the entity 110 to respond to the request using a processor of an entity device.

In another embodiment, a method includes generating a request (e.g., a performance request, a task request, a job request, an article request, a charitable request, an interview, a question to answer, an invitation, a self promotion, a donation request, a mission, and an altruistic request) of an entity (e.g., the entity 110 of FIG. 1, an individual, a group, a business, a celebrity, and an organisation) based on a set of attributes provided by an initiating patron (e.g., the initiating patron 112A of FIG. 1, a requestor, etc.) of the entity using a processor of an initiator device.

Figure 1:
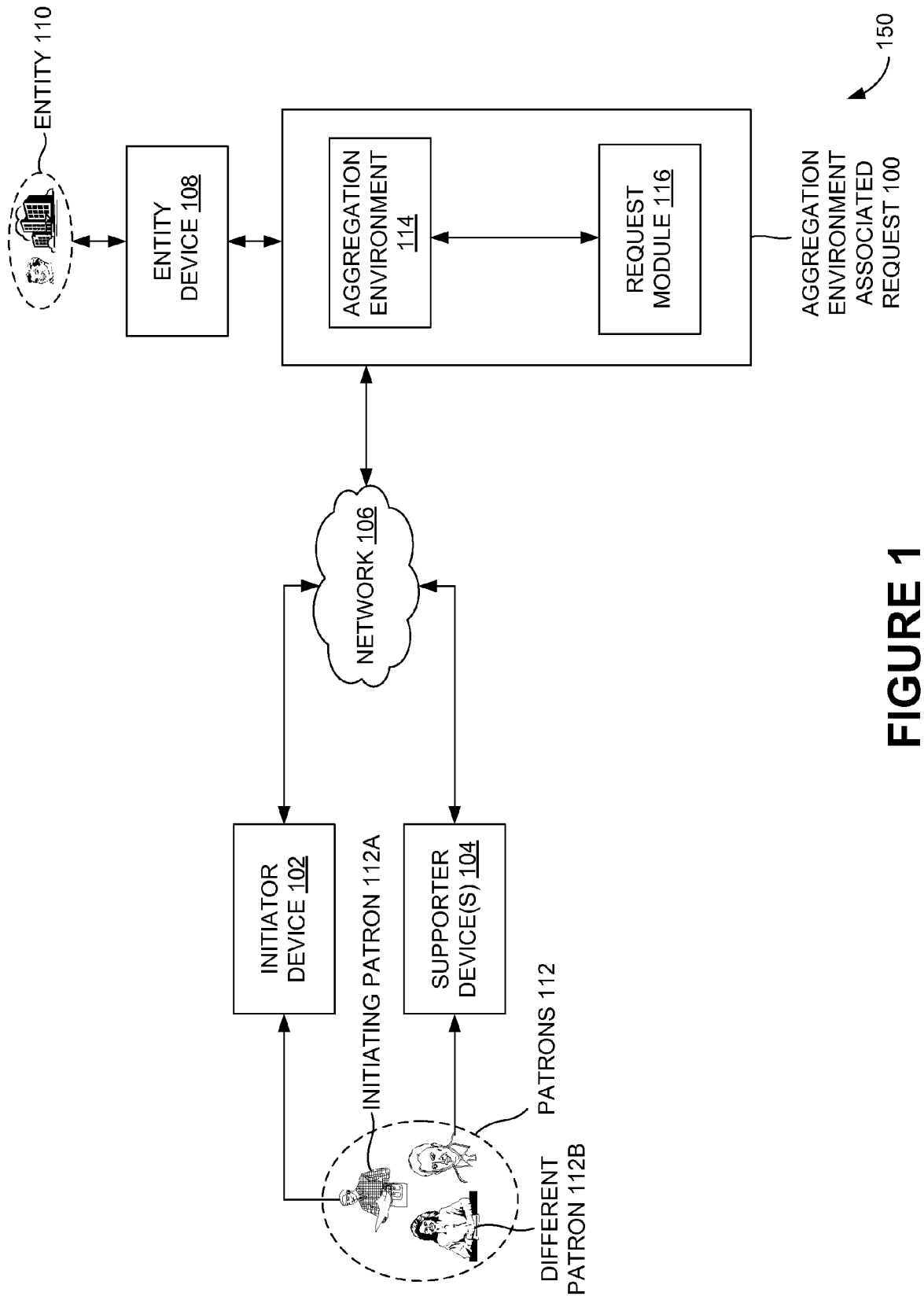
FIG. 1 is a system view of patrons communicating with an entity in a request aggregation environment, according to one embodiment.

The method also includes associating an aggregation environment (e.g., the aggregation environment 114 of FIG. 1) to the request, enabling the initiating patron (e.g., the initiating patron 112A of FIG. 1, a requestor, etc.) to submit the request and allocating initial consideration to the entity (e.g., the entity 110 of FIG. 1, an individual, a group, private figure, a public figure, a celebrity, a business and/or an organization, etc.) in the request aggregating environment (e.g., the aggregation environment associated request 100 of FIG. 1) and enabling the different patron (e.g., the different patron 112B of FIG. 1, a supporter, etc) to contribute the additional considerations to the entity (e.g., the entity 110 of FIG. 1) in the request aggregating environment (e.g., the aggregation environment associated request 100 of FIG. 1) using a processor of a supporter device (e.g., supporter device(s) 104 of FIG. 1).

In another embodiment, a system includes the aggregation environment 114 to manage pooled consideration (e.g., the money pool) associated with each one of a set of requests generated by users (e.g., the patrons 112 of FIG. 1) to one or more of a set of entities 110, an initiator device (e.g., the initiator device 102 of FIG. 1) to generate an initial consideration associated with at least one of the set of requests and a supporter device (e.g., the supporter device(s) 104 of FIG. 1) to provide a supporting consideration to one or more of the set of requests (e.g., using the pledge module 218 of FIG. 2 to increase the money pool associated with a request), and an entity device (e.g., the entity device 108 of FIG. 1) to allow at least one of the set of entities 110 to respond to at least one of the set of requests.

Figure 2:
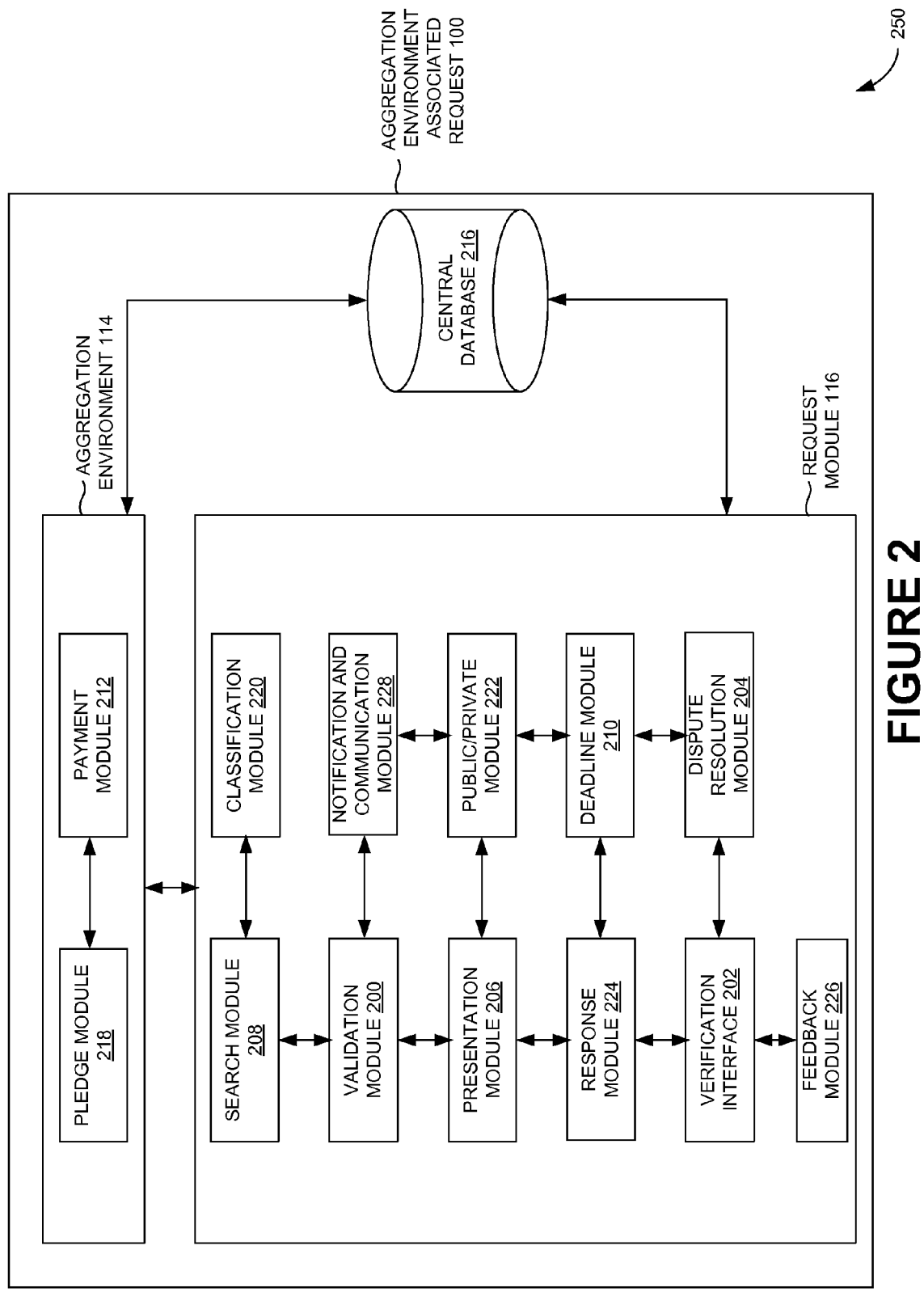
FIG. 2 is an exploded view of the request aggregation environment, according to one embodiment.

In yet another embodiment, a method includes pooling at least one of a money and a credit provided by multiple users and distinct user to a common request to increase a value of the request to an indentified respondent (e.g., as illustrated in FIG. 6B), displaying the common request and other requests to the multiple users and distinct user and the respondent and providing an interface (e.g., the aggregation environment associated request 100 of FIG. 1) to the multiple users and distinct user associating a money pool to the common request (e.g., using the presentation module 206 of FIG. 2), and to the identified respondent to respond to the common request (e.g., using the response module 224 of FIG. 2). For example, a money pool is a pool of at least one of the money and the credit, may be established by multiple users and/or groups aggregating money or credit associated with the request to the entity 110, as illustrated in FIG. 10.

FIG. 1 is a system view 150 of patrons 112 communicating with an entity 110 in an aggregation environment associated request 100, according to one embodiment. Particularly, FIG. 1 illustrates the aggregation environment associated request 100, an initiator device 102, a supporter device(s) 104, a network 106, an entity device 108, the entity 110, the patrons 112, an initiating patron 112A, a different patron 112B, an aggregation environment 114, and a request module 116 according to one embodiment.

The aggregation environment associated request 100 (e.g., a network, a social network, a community, a platform, etc.) may manage pooled consideration (e.g., aggregated sums of money) associated with a set of requests generated by users (e.g., the patrons 112) to a set of entities (e.g., the entity 110). For example, the users may be patrons 112 who have submitted their request to the entity 110 along with an initial consideration (e.g., money, etc., submitted by the initiating patron 112A) and an additional consideration (e.g., submitted by the different patron 112B) in the aggregation environment 114 using a processor of a supporter device.

The initiator device 102 may generate an initial consideration associated with a request (e.g., of the initiating patron 112A). The supporter device(s) 104 may provide (e.g., aggregate) supporting consideration to the request funded through the initiator device 102. The network 106 (e.g., Internet, wireless Internet, WAN, LAN, Bluetooth, Wi-Fi, Wi-Max, telecommunications, radio frequency and/or infrared network, etc.) may enable communication between the entity 110 and the patrons 112 through the aggregation environment associated request 100. The considerations (e.g., the considerations 1400 of FIG. 14) may be allocated to the aggregation environment 114 of the request to increase a value of the request to the entity 110 in order to increase a possibility of the entity 110 to respond to the request. The entity device 108 may process a response of the entity 110.

The aggregation environment (e.g., aggregation environment 114 of FIG. 1) may be a money pool, a credit pool, a point pool, a pool of valuable good, a pool of tangible good, and a pool of intangible good. In one or more embodiments, contribution to the aggregation environment (e.g., aggregation environment 114 of FIG. 1) may be done using a patron billing system, a patron credit system, a patron money system, a patron point system, and a patron tangible good, a patron intangible good and a patron valuable good collection.

Figure 14:
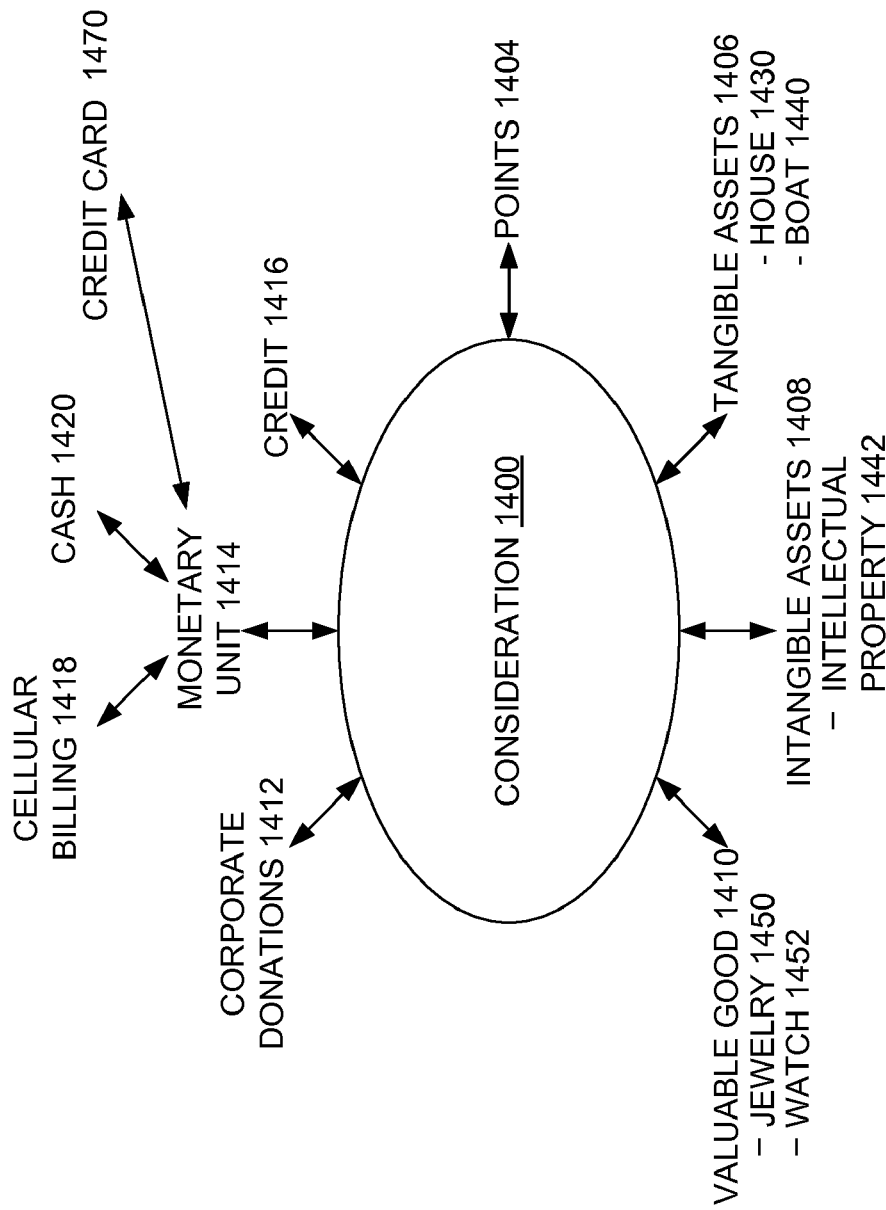
FIG. 14 is a schematic view illustrating pooling of consideration by the patrons, according to one embodiment.

In one or more embodiments, the method may include providing an alert and an update of a size of the aggregation environment (e.g., aggregation environment 114 of FIG. 1) to the entity 110. The method may also include receiving an interest of an acceptance by the entity 110 after considering the size of the aggregation environment 114. The consideration (e.g., as illustrated in FIG. 14) may be a monetary unit, a credit, a point, a tangible asset, an intangible asset, a valuable good. The initiator device 102, the supporter device(s) 104, and the entity device 108 may be a mobile device, a cell phone, a computer, and/or a network enabled device.

The entity 110 may be an individual, a group, a business, a celebrity, and/or an organization that has achieved a sufficient recognition (e.g., reputation, ranking, fame among a targeted audience, etc.) and that considers responding to compelling requests submitted by the patrons 112. The patrons 112 may be followers, legal entities, observers, fans, associates, employees, and/or relatives of the entity 110 who desire to communicate a request to the entity 110. The initiating patron 112A may be the first user to define a request and/or an initial consideration to the entity 110, and/or may grant a set of permissions (e.g., as an authorized patron 112) to the different patrons 112B associated with the request to the entity 110.

The different patrons 112B may be supporters of the initiating patron 112A and/or of the request, who contribute additional consideration (e.g., through the supporter device(s) 104) to the initial consideration provided by the initiating patron 112A and who accept the set of permissions granted by the initiating patron 112A. The aggregation environment associated request 100 may process and/or manage aggregations (e.g., combinations) of requests and associated consideration generated by initiating patrons 112A and different patrons 112B to the entity 110.

The request module 116 may process a response of the entity 110 to the request and allocate the initial consideration and the additional consideration to the entity 110 based on a criteria (e.g., may be a weighted preference based on consideration provided to the request, and an equal preference based on a number of patrons 112 providing any consideration to the request and/or a verification threshold set by the initiating patron) specified by the initiating patron 112A (e.g., specified by the initiating patron prior to the response of the entity 110 to the request). The request module 116 may also communicate the request to the entity 110 and generate a notification to the entity of the request (e.g., based on the requests when the initial consideration and the additional consideration reach an acceptable value set by the entity 110), and enable grouping and sorting of single and/or multiple requests based on a priority in categories searchable in any number of dimensions (e.g., based on profiles of entities 110, attributes of the requests, aggregated consideration associated with the requests, etc.).

In the example embodiment illustrated in FIG. 1, the entity 110 interacts with the entity device 108, and the patrons 112 through the network 106. The patrons 112 may include the initiating patron 112A who communicates with the network 106 through the initiator device 102, and the different patron 112B who communicates with the network 106 through the supporter device(s) 104. In addition, the request aggregation environment 100 may include the aggregation environment 114, and the request module 116.

In one embodiment, the request (e.g., a performance request, a task request, a job request, an article request, a charitable request, an interview, a question to answer, an invitation, a self promotion, a donation, a mission and/or an altruistic request, etc.) of an entity 110 (e.g., an individual, a group, a business, a celebrity and/or an organization) may be generated based on a set of attributes (e.g., required tasks) defined by the initiating patron 112A of the entity 110. The aggregation environment 114 (e.g., a money pool) is associated to the request. The initial consideration (e.g., a sum of money to motivate the entity 110 to respond to the request) may be allocated to the request from the initiating patron 112A.

The additional consideration may be allocated to the initial consideration when the different patron 112B contributes the additional consideration to the request (e.g., of the initiating patron 112A). The aggregation environment associated request 100 may manage pooled consideration associated with each one of the sets of requests generated by users to one or more of a set of entities 110. The initiator device 102 may generate an initial consideration associated with the set of requests. The supporter device 104 may provide supporting consideration to the set of requests funded through the initiator device 102.

FIG. 2 is an exploded view 250 of the aggregation environment associated request 100, according to one embodiment. Particularly, FIG. 2 illustrates the aggregation environment associated request 100, the aggregation environment 114, the request module 116, a validation module 200, a verification interface 202, a dispute resolution module 204, a presentation module 206, a search module 208, a deadline module 210, a payment module (include payment, refund, fee) 212, a central database 216, a pledge module 218, a classification module 220, a public/private module 222, a response module 224, a feedback module 226, a notification and communication module 228, according to one embodiment.

The validation module 200 may determine whether contact information of the entity 110 is provided through the initiator device 102 and the supporter device(s) 104 and/or references to a verified contact data. The verification interface 202 may allocate the initial consideration and the additional consideration to the entity 110 based on the verification results. The dispute resolution module 204 may assign a neutral third party to arbitrate disputes between patrons 112 and the entity 110 through the verification interface 202. The search module 208 may enable the respondent to search for grouped requests having various categories in any number of dimensions. In addition, the search module 208 may also enable patrons 112 to designate and search any number of interests in profiles of the patrons 112. The deadline module 210 may initiate a set of deadlines to the request based on a set of permissions authorized by the initiating patron 112A. For example, the set of deadlines may include a deadline to provide additional consideration, a deadline to add additional requests when the initiating patron provides for this ability, a deadline to accept the request, a deadline to fulfill the request after accepting and a deadline to verify the response of the request.

The payment module 212 may allocate the initial consideration and the additional consideration to the respondent entity 110 when the response is accepted through the verification interface 202, and to issue a refund to the initiating patron 112A and the different patron 112B when the entity 110 does not accept the request and/or the response is rejected through the verification interface 202.

The central database 216 may store information including the set of requests, a set of user profiles, the contact data as the verified contact data, and other information. The pledge module 218 may allocate the initial consideration and the additional consideration through an account funded through a subscription service and/or a trusted financial intermediary. A minimum pledge amount may be set to the request based on the set of permissions authorized by the initiating patron 112A.

The classification module 220 may group the request and the multiple requests into various categories searchable in any number of dimensions. The public/private module 222 may enable a public group that can be subscribed to by any user or a private group that can only be subscribed by the patrons 112 who are invited by the patron who started the private group. The public module may be enabled to generate a public request shared with all the users of the aggregation environment associated request 100. The private request submitted by the entity 110 may mask an identity of the initiating patron 112A and may be shared only with invitees and the entity 110. The response module 224 may automatically accept the request on behalf of the entity 110 when the threshold value is exceeded.

In the example embodiment illustrated in FIG. 2, the aggregation environment associated request 100 includes the aggregation environment 114 and the request module 116 that communicates with the central database 216. The aggregation environment 114 further may include the pledge module 218 and the payment module (include payment, refund) 212. The request module 116 may include the deadline module 210, the public/private module 222 and the validation module 200, the search module 208, the classification module 220, the feedback module 226, the notification and communication module 228 and the presentation module 206, the verification interface 202, the dispute resolution module 204, and the response module 224. Those modules communicate with each other.

In another embodiment, it may be determined whether a contact information of the entity (e.g., the entity 110 of FIG. 1) provided by the initiating patron (e.g., the initiating patron 112A of FIG. 1) and the different patron (e.g., the different patron 112B of FIG. 1) references to a verified contact data (e.g., using the validation module 200 of FIG. 2). The request to the entity 110 may be communicated (e.g., using the notification and communication module 228 of FIG. 2) based on the contact information and the verified contact data. The response of the entity 110 to the request may be processed (e.g., using the response module 224 of FIG. 2).

The verification interface 202 may be provided to the initiating patron 112A and the different patron 112B. The initial consideration and the additional consideration may be determined (e.g., using the pledge module 218 of FIG. 2) through account funded through the subscription service and/or the trusted financial intermediary. The criteria may be set as a weighted preference based on consideration provided to the request and an equal preference based on a number of patrons 112 providing any consideration to the request. A voting record in the profile of the initiating patron 112A and the different patron 112B may be stored.

Disputes between patrons 112 and the entity 110 may be arbitrated through the dispute resolution module 204 by involving a neutral third party in the verification interface 202. The request may be automatically accepted on behalf of the entity 110 when the threshold value is exceeded. Where the initial consideration and the additional consideration are to be allocated may be designated based on a preference of the entity 110. Patrons 112 may be enabled to designate and search interest in profiles of the patrons 112.

Interest of each patron 112 may be shared with other users of the aggregation environment 114 through their profiles. A set of requests individually displayed to the patrons 112 may be customized based on the interest provided in the profiles of the patrons 112. A group of patrons 112 (e.g., may be a private group accessible only by invitees and a public group that can be subscribed to by any user) may be formed.

The initiating patron 112A may submit a private request to the entity 110 such that the private request is shared only among invitees and the entity 110. Only patrons (e.g., such as the different patron 112B) who are invited by initiating patron 112A can view and/or optionally invite other patrons to view and allocate additional consideration to the request. The identity of the initiating patron 112A associated with the private request may be masked from the entity 110.

The validation module 200 of the request module 116 may determine whether a contact information of the entity 110 provided through the initiator device 102 and the supporter device 104 references to a verified contact data. The notification and communication module 228 of the request module 116 may communicate the request to the entity 110 based on the contact information and the verified contact data. The presentation module 206 of the request module 116 may post the request to the different patron 112B.

The central database 216 of the aggregation environment associated request 100 may store information including the set of requests, a set of user profiles, the contact data as the verified contact data, and other information. The pledge module 218 of the aggregation environment associated request 100 may allocate the initial consideration and the additional consideration through account funded through the subscription service and/or the trusted financial intermediary. The notification and communication module 228 of the aggregation environment associated request 100 may generate a notification to the entity of the request when the initial consideration and the additional consideration reach an acceptable value set by the entity 110. The response module 224 of the aggregation environment associated request 100 may process a response of the entity 110 to the request.

The verification interface 202 of the aggregation environment associated request 100 may provide the verification of the response result of the entity 110 based on an initiating patron specified criteria (e.g., may be a weighted preference based on consideration provided to the request, and an equal preference based on a number of patrons 112 providing any consideration to the request and/or a verification threshold set by the initiating patron) provided prior to the response of the entity 110 to the request.

The interface may be provided such that the respondent and the multiple and distinct users providing consideration to the common request are able to resolve disputes through a neutral third party assigned in the interface through a common agreement between the respondent, and the multiple and distinct users. Where the consideration provided may be designated by the multiple and distinct users are to be allocated based on a preference of the respondent. A refund to the multiple and distinct users may be provided when the respondent does not accept the request and when the response is rejected through the verification interface 202. The feedback module 226 of the aggregation environment associated request 100 may provide an interface to the multiple and distinct users to give feedback of the response to the respondent in form such that the feedback and any response thereto are viewable by other users.

Figure 3:
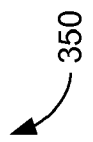
FIG. 3 is a table view of details associated with a user request in the request aggregation environment, according to one embodiment.

FIG. 3 is a table view of details associated with a user request in the aggregation environment 114, according to one embodiment. Particularly, FIG. 3 illustrates a request ID field 302, a request title field 304, a task field 306, a total consideration field 308, an initiator field 310, an entity field 312, a request close deadline field 314, number of patrons field 316, a type (public/private) field 318 and a category field 320, according to one embodiment.

The request ID field 302 may display a unique identity (e.g., number, key, etc.) referencing the request in the aggregation environment associated request 100. The request title field 304 may display the title of request to be allocated by the initiating patron 112A and the different patron 112B to the entity 110 in the aggregation environment associated request 100. The task field 306 may display the kind of request (e.g., meeting request, question request, etc.) desired by the initiating patron 112A and the different patron 112B in the aggregation environment associated request 100.

The total consideration field 308 may display the sum of amount which is something of value provided by the patron 112 to the entity 110, such as money, goods and services that will compel the entity 110 for response. The initiator field 310 may display the name of the initiating patron 112A associated with the request in the aggregation environment associated request 100. The entity field 312 may display the name of the respondent referencing the entity 110 associated with the request in the aggregation environment associated request 100. The request close deadline field 314 may indicate the ending time to allow the patron 112 to allocate the consideration to the aggregation environment 114. The number of patrons field 316 may indicate the total number of participant patrons 112 taking part in the request in the aggregation environment associated request 100. The type (public/private) field 318 may display the type of request (e.g., public request, private request, etc.) submitted by the patrons 112 to the entity 110. The category field 320 may display the classification under which the request is associated in the aggregation environment associated request 100.

In the example embodiment illustrated in FIG. 3, the request id field 302 displays "1001" in the first row, indicating the unique identity (e.g., number, key, etc.) in the request id field column 302. The request title field 304 displays "Question Bob Smith" in the first row, indicating the title of the request to be allocated by the initiating patron 112A and the different patron 112B to the respondent in the aggregation environment associated request 100. The task field 306 displays "Question" in the first row, indicating that the different patron 112B requests an answer to a question, in the task field column 306. The total consideration field 308 displays "$70000" in the first row, indicating the total amount of consideration provided by the patrons 112 to the aggregation environment 114 along with each request in the total consideration provided field column 308.

The initiator field 310 displays "Michael Lee" in the first row, indicating the name of the initiating patron 112A. The entity field 312 displays "Bob Smith" in the first row, indicating the name of the respondent. The request close deadline field 314 displays "7/1/2008" in the first row, which indicates the ending times to allow the patron 112 to allocate the consideration to the aggregation environment 114. The number of patrons field 316 displays "1000" in the first row, which indicates the total number of participant patrons 112 taking part in the request in the aggregation environment associated request 100. The type (public/private) field 318 displays "Public" in the first row, which indicates the type of request submitted by the patron 112 to the entity 110, in the type (public/private) field column 318. The category field 320 displays "sports" in the first row, which indicates the classification under which the request is associated in the aggregation environment associated request 100.

Figure 4:
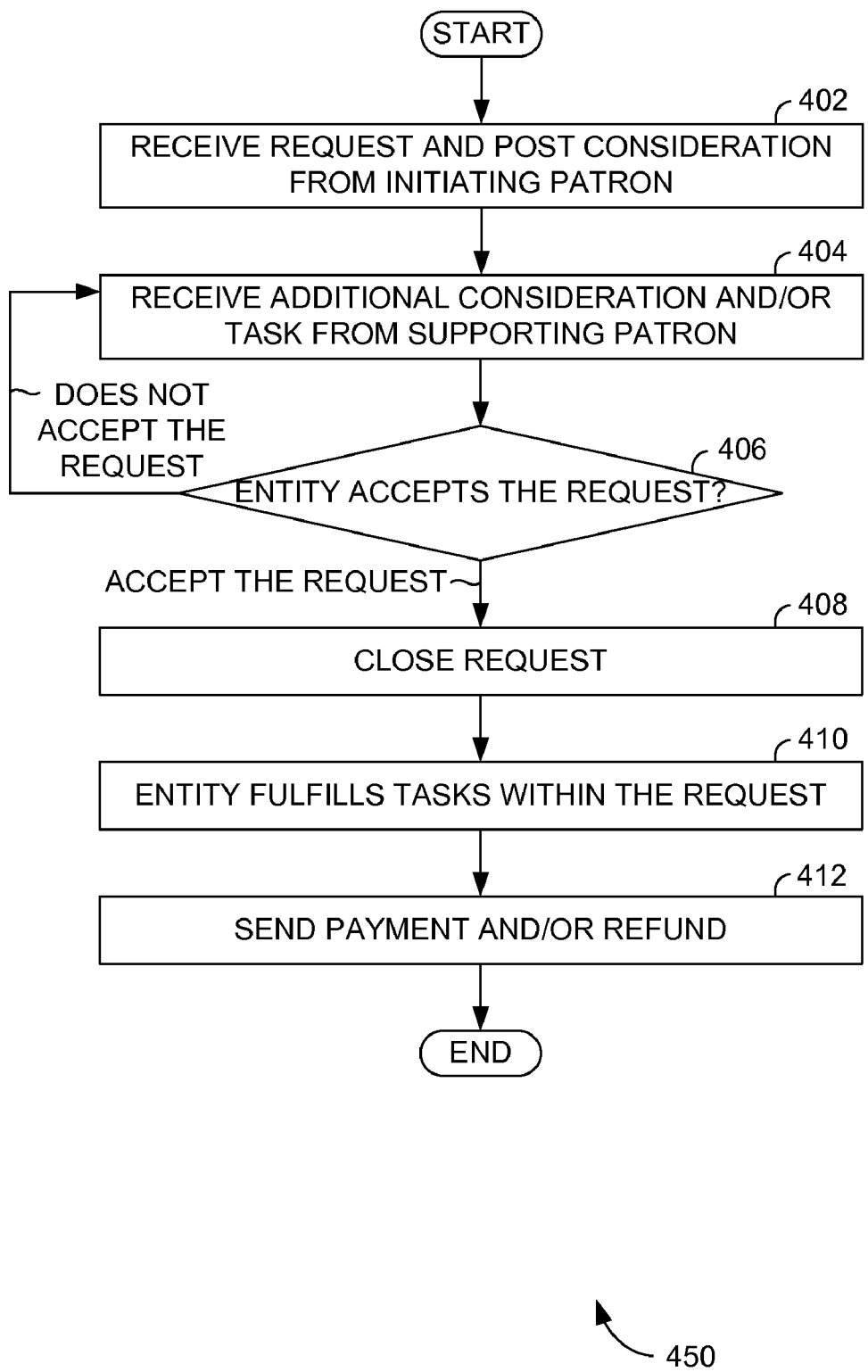
FIG. 4 is a flow chart of processing the request through the request aggregation environment, according to one embodiment.

FIG. 4 is a flow chart of processing the request through the aggregation environment associated request 100 of FIG. 1, according to one embodiment. In operation 402, a request from patrons 112 (e.g., may be the performance request, the task request, the job request, the article request, the charitable request, the interview, the question to answer, the invitation, the self promotion, the donation request, the mission, and/or the altruistic request.) is received and initial consideration from initiating patron 112A to the entity 110 is posted. For example, the entity may be an individual, a group, a business, a celebrity and/or an organization.

In operation 404, additional consideration and/or task from the patrons 112 may be received by the entity 110 (e.g., based on a verified contact data (e.g., using the notification and communication module 228 of FIG. 2)). In operation 406, it may be determined whether the entity 110 accepts the request. If the entity 110 accepts the request, operation 408 may be performed. If the entity 110 does not accept the request then the operation 404 may continue. In operation 408, after the entity 110 may accept the request, the request may be closed. In operation 410, the entity 110 fulfills tasks within the requests made by the patrons 112 based on a set of deadlines. In operation 412, if the entity 110 may have fulfilled as per the request of the patrons 112 after accepting then a payment may be provided to the entity 110 or else the request may be rejected and a refund may be provided to the patrons 112.

Figure 5A:
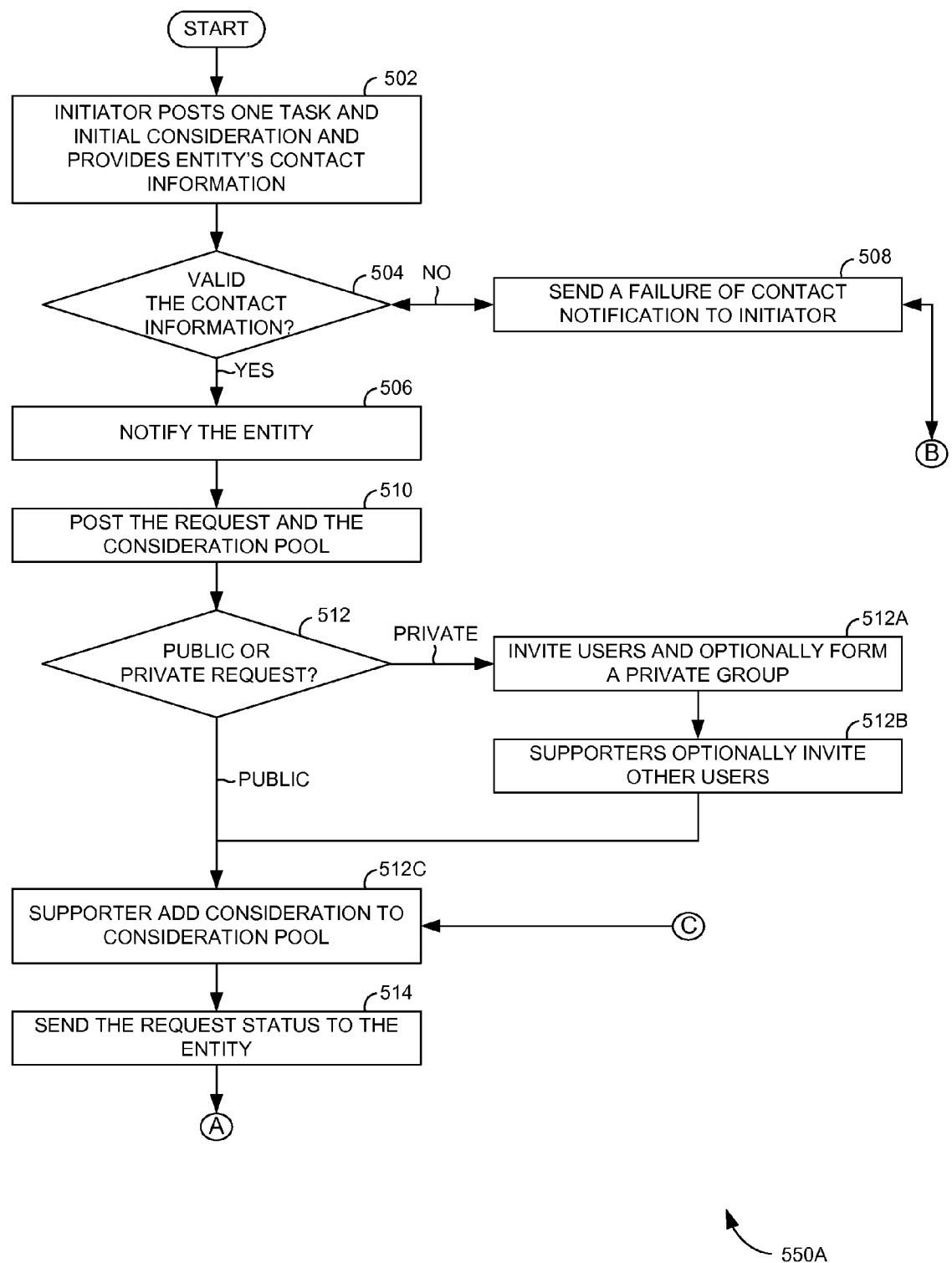
FIG. 5A is a flow chart of aggregating consideration associated with a request processed through the request aggregation environment, according to one embodiment.

FIG. 5A is a flow chart of aggregating consideration associated with a request processed through the aggregation environment associated request 100, according to one embodiment. In operation 502, an initiating patron 112A may post one task along with initial consideration (e.g., using the initiator device 102 of FIG. 1) and may provide entity 110 contact information. In operation 504, it may be determined whether the contact information provided by the initiating patron 112A may be valid or not (e.g., using a validation module 200 of FIG. 2). If the contact information provided by the initiating patron 112A may be valid then operation 506 may be initiated. If the contact information provided by the initiating patron 112A may not valid, then operation 508 may be initiated.

In operation 506, if the contact information of the entity 110 provided by the initiating patron 112A is valid, the entity 110 may be notified. In operation 508, a failure contact notification may be sent to initiating patron 112A, if the contact information of the entity 110 provided by the initiating patron 112A is invalid, the operation refund process 534 may be performed. In operation 510, the consideration may be posted to the aggregation environment 114 after the successful notification to the entity 110.

In operation 512, it may be determined whether the request may be public or private (e.g., using a public/private module 222 of FIG. 2). If the request may be public then operation 512C may be initiated. If the request may be private then operation 512A may be initiated. In operation 512A, the initiating patron 112A may invite the different patrons 112B to join the request and have an option to form a private group. In operation 512B, the supporters may optionally invite other users (e.g., the patrons 112 of FIG. 1) to add consideration to the request. In operation 512C, supporter (e.g., the different patrons 112B of FIG. 1) may add additional consideration (e.g., may be something of value provided by the patron 112 to the entity 110, such as money, goods and services that will compel the entity 110 for response) to the aggregation environment 114 initiated by the initiating patron 112A. In operation 514, the request status of the patrons 112 may be sent to the entity 110.

Figure 5B:
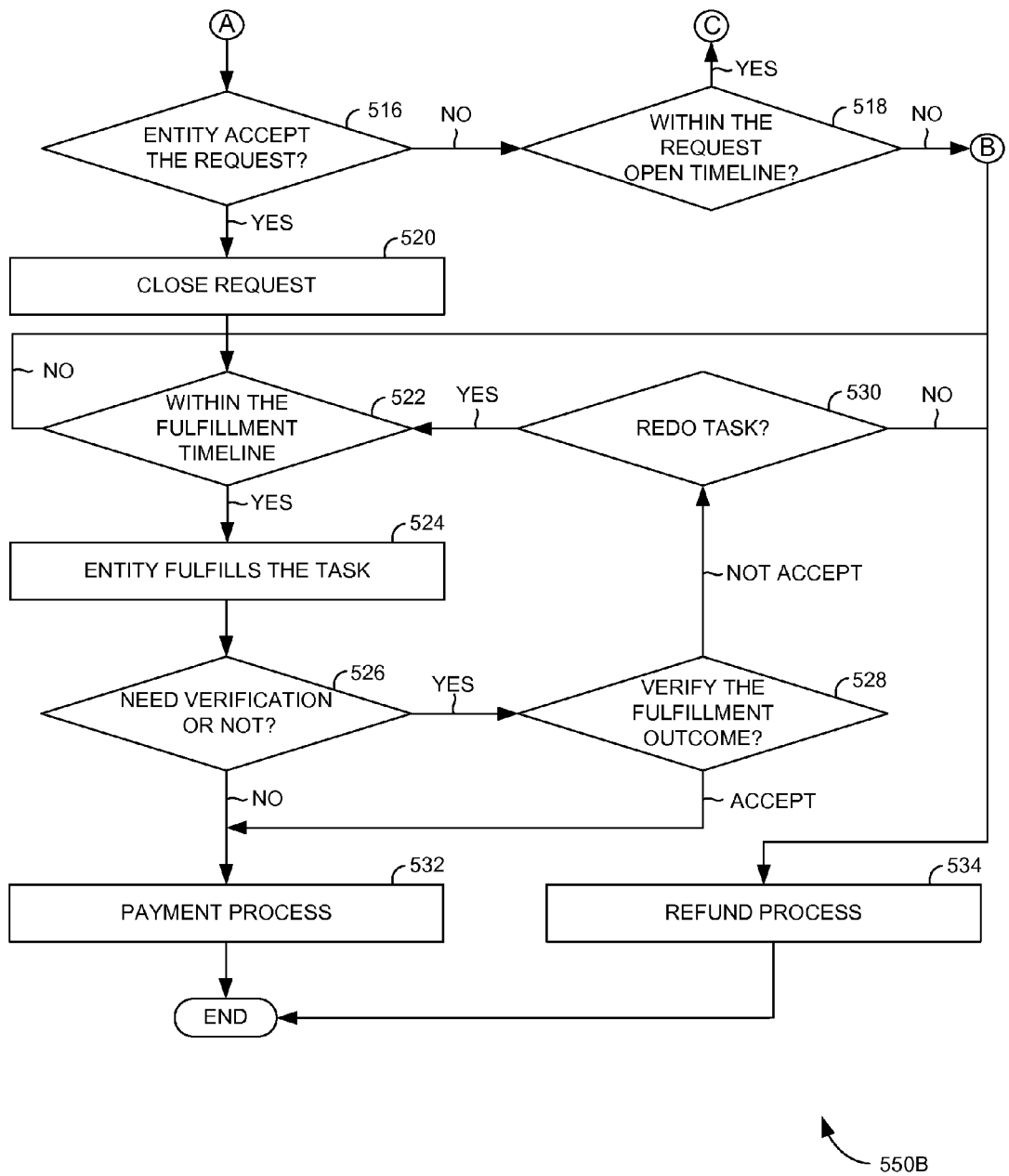
FIG. 5B is a continuation of the flow chart of FIG. 5A illustrating additional processes, according to one embodiment.

FIG. 5B is a continuation of the flow chart of FIG. 5A illustrating additional processes, according to one embodiment. In operation 516, it may be determined whether entity 110 accepts the request or not. If the entity 110 accepts the request, operation 520 may be initiated. Otherwise, if the entity 110 does not accept the offer, then operation 518 may be initiated. In operation 518, a condition may be determined to accept the request within the open timeline. If the timeline for the entity 110 to accept the offer may be still open, then operation 512C may be initiated for additional consideration from supporter (e.g., supporting patron 112B). If the timeline to accept the offer may be closed, then the operation 534 may be performed. In operation 520, the request can be closed after the entity 110 accepts the offer.

In operation 522, it may be determined whether the entity 110 can fulfill the request within the fulfillment timeline. If the entity 110 is unable to fulfill the task of the request within the timeline, then operation 534 may be performed. If the entity 110 can fulfill the request within the defined timeline, an operation 524 can be initiated. In operation 524, the entity 110 may fulfill the task after accepting the request. In operation 526, a condition may be determined to verify the outcome of fulfillment. If verification may be requested by the patrons 112, then operation 528 may be performed. If the verification may not be required by the patrons 112, then operation 532 may be performed.

In operation 528, if the patrons 112 do not accept the fulfillment outcome, then it may be determined whether the task to be redone within the timeline. If the patrons 112 verify the fulfillment outcome, then operation 532 may be performed. In operation 530, if the task may be redone within the timeline, then operation 522 and further operations from 522 may be performed. If the task cannot be redone within the timeline then operation 534 may be performed. In operation 532, after the patron 112 accepts the fulfillment outcome of the task, then payment may be processed to the entity 110. In operation 534, the refunding process may be processed to the patrons 112.

In one embodiment, the contact information may be validated with the entity (e.g., the entity 110 of FIG. 1) when the verified contact data is absent. The contact data may be stored as the verified contact data. The initial consideration and the additional consideration may be allocated to the entity 110 based on the verification results (e.g., using verification interface 202 of FIG. 2). The initiating patron 112A and the different patron (e.g., the different patron 112B of FIG. 1) may be enabled to create and submit multiple requests to the entity 110. The request and the multiple requests may be grouped in categories searchable in any number of dimensions.

The initiating patron 112A and the different patron 112B may be enabled to allocate tasks to the request based on the set of permissions authorized by the initiating patron 112A. A minimum pledge amount and a set of deadlines (e.g., may include a deadline to provide the additional consideration, a deadline to add additional requests when the initiating patron 112A provides for this ability, a deadline to accept the request, a deadline to fulfill the request after accepting and a deadline to verify the response of the request) may be set to the request based on the set of permissions. Additional information associated with the request and a response to the request by the entity 110 may be accepted in any multimedia format.

In another embodiment, the refund may be provided to the initiating patron (e.g., the initiating patron 112A of FIG. 1) and the different patron (e.g., the different patron 112B of FIG. 1) when the response is rejected through the verification interface (e.g., the verification interface 202 of FIG. 2). A partial fulfillment and redoing of the request by the entity (e.g., the entity 110 of FIG. 1) may be permitted when the initiating patron 112A and the different patron 112B permits. Providing to the entity 110 a feedback to the response may be enabled by the initiating patron 112A and the different patron 112B.

FIG. 6A is a user interface view 650A of a response requested of an entity 110, according to one embodiment. Particularly, FIG. 6A illustrates a request ID 600, an initiator 602, a money pool size 604, participated request users 606, a minimal contribute unit 608, accepting deadline 610, allow additional tasks 612, allow fulfill less tasks 614, an task deadline 616, a fulfill deadline 618, a verification method 620, a verification deadline 621, a redo allow 622, task 1 624 and task 2 626, and upload images or video clips option 628, according to one embodiment.

The request ID 600 may be an identifier (e.g., unique number, code, etc.) referencing offers associated with the request submitted by the initiating patron 112A to the entity 110. The initiator 602 may be a name of the initiating patron 112A who submits the request to the entity 110. The money pool size 604 may be the total amount of money provided by the patron 112 to the entity 110 that will make the request to compel the entity 110 for response. The participated request users 606 may indicate the total number of the patrons 112 participating in the request. The minimal contribute unit 608 may be a minimum consideration amount that each user may provide to the money pool (e.g., the aggregation environment 114).

The accepting deadline 610 may be a deadline to accept the request by the entity 110. Allow additional tasks 612 may be an option to opt for additional tasks to be added by the different patron 112B to the request allowed by the initiating patron 112A. Allow fulfill less tasks 614 may be an option to allow the entity 110 to fulfill only a portion of the tasks in the request. The add task deadline 616 may be a deadline to allocate additional tasks for the submission of the offer by the patrons 112 to the entity 110. The fulfill deadline 618 may be a deadline to fulfill the request after accepting the request made by the patrons 112.

The verification method 620 may be a method of verification, by which the patrons 112 verify the responses of the entity 110 (e.g., by method of voting by the patrons 112, by initiating patron 112A, by a neutral third party etc.). The verification deadline 621 may be a deadline to verify the response of the entity 110. The redo allow 622 may be number of times the entity 110 can fulfill the request for the patrons 112 to accept it. The 'task 1' 624 and 'task 2' 626 may be the tasks allocated by the initiating patron 112A and the different patron 112B to the respondent in any multimedia format (e.g., the respondent may enter the responses in the text fields). Upload images or video clips option 628 may be an option through which respondent (e.g., the entity 110) may respond to the request made by the patron 112 by uploading in the multimedia content.

In the example embodiment illustrated in FIG. 6A, the user interface view 650A displays the respondent view having a request format submitted by the initiating patron 112A to the respondent referencing the entity 110 which may include the request ID 600 displaying a unique ID (e.g., A1011145) with respect to the request made by the initiator 602 (e.g., Chris Bob) who is the initiating patron 112A for this request. The user interface view 650A also displays money pool size 604 which is the amount for which the request has been made along with the participated request users 606, the minimal contribute unit 608, the accepting deadline 610, allow additional tasks 612, allow fulfill less tasks 614, the add task deadline 616, the fulfill deadline 618, the verification method 620, the verification deadline 621 and redo allow 622. The 'task 1' 624 and 'task 2' 626 may be the tasks allocated based on the request submitted by the patrons 112 to the respondent referencing the entity 110. The upload images or video clips 628 displays an option though which the respondent referencing the entity 110 can respond to the request made by the patrons 112 through the multimedia format.

The summary view of the request and other requests having an initial consideration and an additional consideration reach an acceptable value set by the entity (e.g., the entity 110 of FIG. 1) in a profile of the entity 110 may be generated. The consideration provided by multiple users and distinct user to a common request may be allocated to increase a value of the request to a respondent. The common request and other requests may be displayed to the multiple users and distinct user and the respondent.

FIG. 6B is a user interface view 650B of requests associated with the patron 112, according to one embodiment. Particularly, FIG. 6B illustrates a request block 630, a name of the request 631, a request detail block 632, a respondent 633, a type of request 634, a verification option 635, a my consideration 636, tasks 638 and an add more tasks option 640, according to one embodiment. The request block 630 may display title, information and details of the request along with the access privileges and the amount of consideration the patrons 112 are willing to provide to the respondent 633. The name of the request 631 is the name of one of request associated with the patron 112. The request detail block 632 may display the detail information of the highlighted name of the request 631. The respondent 633 (e.g., the entity 110 of FIG. 1) is an individual, a group, private figure, a public figure, a celebrity, a business and/or an organization, etc. The type of request 634 may display the access privileges enabling the initiating patron 112A to submit a private request or public request. For example the private request may be shared only among invitees and the respondent 633 (e.g., only the different patron 112B who are invited by initiating patron 112A can view and optionally invite other different patron 112B to view and allocate additional consideration to the request). In contrast, the public request may be accessible by any patron.

The verification option 635 may allow the user to verify the request the verification interface 202 as previously described. The patrons 112 may also accept the response of the respondent 633 without verification. The tasks 638 may enable the initiating patron 112A and the different patron 112B to allocate number of tasks to the request based on the set of permissions authorized by the initiating patron 112A. The add more task option 640 may display an option to add additional tasks by the initiating patron 112A and the different patron 112B based on the set of permissions authorized by the initiating patron 112A.

In the example embodiment illustrated in FIG. 6B, the user interface view 650B displays the patron view having a submission format for the patrons 112 to fill the request along with the consideration and submit the offer to the respondent 633. In addition, the user interface view 650B displays the request block 630 which displays the information and details of the requests along with the access privileges and the amount of consideration to be accepted by the respondent 633 from the patrons 112. The tasks 638 and add more task option 640 enables the initiating patron 112A and the different patron 112B to allocate additional tasks to the request before the expiry timeline of the offer. The interface to the multiple users and distinct user may be provided to verify and validate a response to the common request when the respondent 633 provides a response to the common request.

FIG. 7 is a user interface view 750 of selecting a verification method, according to one embodiment. Particularly, FIG. 7 illustrates a verify by initiator only option 702, a verify by third party option 704 and a verify by vote option 706, according to one embodiment.

The verify by initiator only option 702 may be used for verification through initiating patron 112A only. The verify by third party option 704 may be the verification by neutral third party assigned in the verification interface 202 using third party's name, email and address. The verify by vote option 706 may be used for verification of votes per money pool member or verification of vote per dollar of money pool money.

In the example embodiment illustrated in FIG. 7, the user interface view 750 displays various methods for verification. The verification may be processed by an initiator, a third party, and/or through a voting process. The third party verification has various structured fields to display third party name, email and/or address to be filled by the initiator. The vote verification may be processed by either verification of votes per money pool member option, verification of vote per dollar of money pool money option, and/or a vote threshold set by the initiator.

Figure 8:
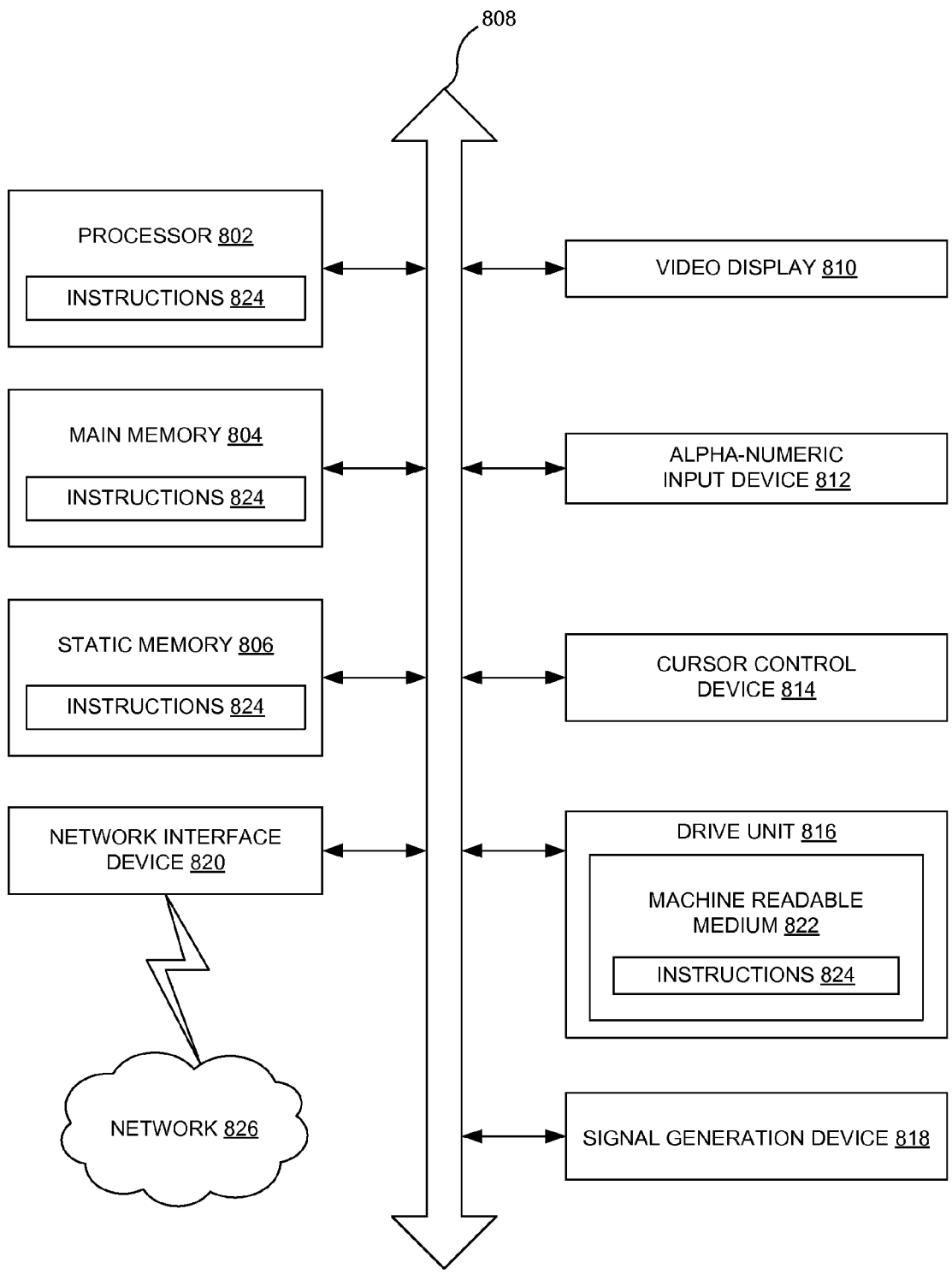
FIG. 8 is a diagrammatic system view of a data processing system in which any of the embodiments disclosed herein may be performed, according to one embodiment.

FIG. 8 is a diagrammatic system view 850 of a data processing system in which any of the embodiments disclosed herein may be performed, according to one embodiment. Particularly, the diagrammatic system view 850 of FIG. 8 illustrates a processor 802, a main memory 804, a static memory 806, a bus 808, a video display 810, an alpha-numeric input device 812, a cursor control device 814, a drive unit 816, a signal generation device 818, a network interface device 820, a machine readable medium 822, instructions 824 and a network 826, according to one embodiment.

The diagrammatic system view 850 may indicate a personal computer, a mobile device, a cell phone, a network enabled device and/or a data processing system in which one or more operations disclosed herein may be performed. The processor 802 may be a microprocessor, a state machine, an application-specific integrated circuit, a field programmable gate array, etc. (e.g., Intel® Pentium® processor). The main memory 804 may be a dynamic random access memory and/or a primary memory of a computer system. The static memory 806 may be a hard drive, a flash drive, and/or other memory information associated with the data processing system.

The bus 808 may be an interconnection between various circuits and/or structures of the data processing system. The video display 810 may provide graphical representation of information on the data processing system. The alpha-numeric input device 812 may be a keypad, a keyboard and/or any other input device of text (e.g., a special device to aid the physically challenged). The cursor control device 814 may be a pointing device such as a mouse.

The drive unit 816 may be the hard drive, a storage system, and/or other longer term storage subsystem. The signal generation device 818 may be a bios and/or a functional operating system of the data processing system. The network interface device 820 may be a device that may perform interface functions such as code conversion, protocol conversion and/or buffering required for communication to and from a network 826.

The machine readable medium 822 may provide instructions on which any of the methods disclosed herein may be performed. The instructions 824 may provide source code and/or data code to the processor 802 to enable any one or more operations disclosed herein.

FIG. 9A is a form and table view 950A associated with a patron 906A, according to one embodiment. FIG. 9A illustrates an Open Offer form 902A that shows open offers submitted or participated by the patron 906A. FIG. 9A also illustrates an Offer History table 904A that shows previous offers submitted or participated by the patron 906A. The Open Offer form 902A displays the current status of the open offers. The patron 906A can add money, tasks to an offer, or verify the response of an offer. The Offer History table 904A displays some of the information inputted by the patron 906A through the Open Offers form 902A. In addition, the Offer History table 904A may show a status of each request, and may include an indicator that associates the Offer History table 904A with a Results table (not shown) that contains responses to the requests in the Offer History table 904A by the entity 906B associated with each request.

FIG. 9B is a form and table view 950B associated with an entity 906B, according to one embodiment. FIG. 9B illustrates an Open Offer form 902B that shows open offers submitted by the patron 906A to the entity 906B. FIG. 9B also illustrates an Offer History table 904B that shows previous offers submitted by the patron 906A to the entity 906B. The Open Offer form 902B displays the current status of the open offers. The entity 906B can set accept threshold of an offer, accept an offer, fulfill tasks, or select the payment method of an offer. The Offer History table 904B displays some of the information inputted by the patron 906A and also displays the request accepted, rejected or fulfilled by the entity 906B through the Open Offers form 902B. In addition, the Offer History table 904B may show a status of each request, and may include an indicator that associates the Offer History table 904B with a Results table (not shown) that contains responses to the requests in the Offer History table 904B by the entity 906B associated with each request.

FIG. 10 is a user interface view 1050 displaying a selection of money pools associated with requests in the aggregation environment associated request 100, according to one embodiment. In the example embodiment illustrated in FIG. 10, the user interface view 1050 displays the summary view of the requests having a top consideration to the browser (e.g., distinct users, multiple users, etc.) who can access the information provided on the webpage. In addition, the user interface view 1050 enables the user to view requests which may be classified in various categories (e.g., sports, political, question, interview, etc.) searchable in any number of dimensions by the user. For example, the patrons 112 may request the entity 110 to perform an activity for them, prepare an article for them, answer questions for them and/or video record a message for them, etc. which may be displayed in the summary view available for the users to view the request. The users can view the newest requests, the requests with most number of the patrons 112, or the requests will be ending soon, etc. in each category. The users can view the requests by search the entity 110, the patrons 112, the categories, and/or the keywords, etc.

Figure 11A:
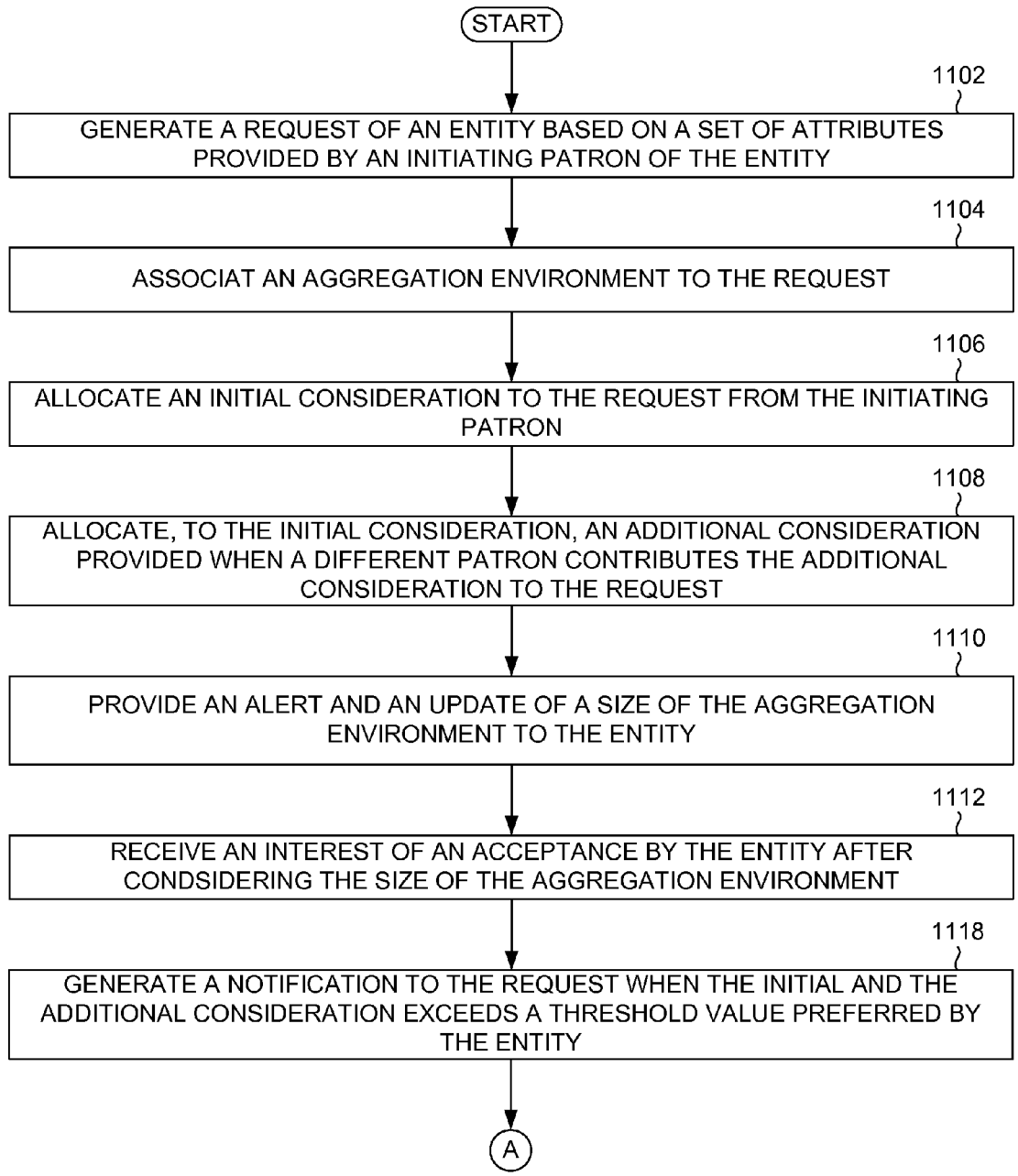
FIG. 11A is a process flow of generating a request of an entity based on a set of attributes provided by an initiating patron, according to one embodiment.

FIG. 11A is a process flow of generating a request of an entity 110 based on a set of attributes provided by an initiating patron 112A, according to one embodiment. In operation 1102, a request of an entity 110 (e.g., may be an individual, a group, a business, a celebrity, and/or an organization) may be generated based on a set of attributes provided by the initiating patron (e.g., the initiating patron 112A of FIG. 1) of the entity 110. In operation 1104, an aggregation environment 114 is associated to the request. In operation 1106, an initial consideration may be allocated to the aggregation environment 114 from the initiating patron 112A.

In operation 1108, an additional consideration may be provided when a different patron (e.g., the different patron 112B of FIG. 1) contributes the additional consideration to the aggregation environment 114 of the request (e.g., as illustrated in FIG. 9) may be allocated to the initial consideration. In operation 1110, an alert and an update of a size of the aggregation environment 114 of a request may be send to the entity 110 (e.g., using the notification and communication module 228 of FIG. 2). In operation 1112, the entity 110 shows an interest of accepting a request after considering the total amount of the aggregation environment 114 associated with the request (e.g., using a response module 224 of FIG. 2). In operation 1118, a notification may be generated and communicated to the entity of the request when the initial consideration and the additional consideration exceed a threshold value preferred by the entity 110.

Figure 11B:
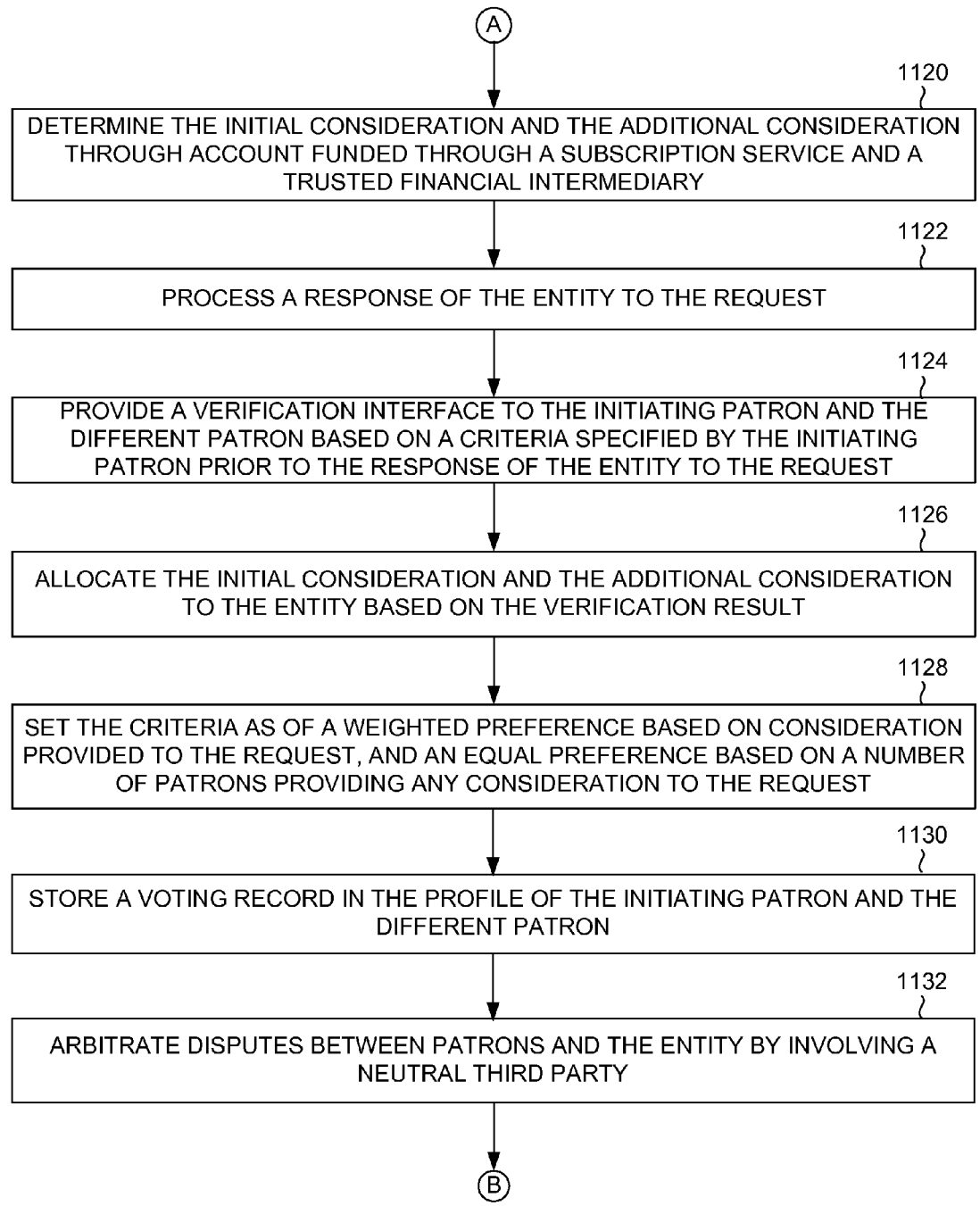
FIG. 11B is a continuation of the process flow of FIG. 11A illustrating additional processes, according to one embodiment.

FIG. 11B is a continuation of the process flow of FIG. 11A illustrating additional processes, according to one embodiment. In operation 1120, the initial consideration and the additional consideration may be determined through an account funded through a subscription service and/or a trusted financial intermediary (e.g., using the pledge module 218 of FIG. 2). In operation 1122, a response of the entity 110 to the request may be processed. In operation 1124, a verification interface (e.g., the verification interface 202 of FIG. 2) may be provided to the initiating patron 112A and the different patron 112B based on criteria specified by the initiating patron 112A prior to the response of the entity 110 to the request.

In operation 1126, the initial consideration and the additional consideration may be allocated to the entity 110 based on the verification result (e.g., using the payment module 212 of FIG. 2). In operation 1128, the verification criteria may be set as a weighted preference based on consideration provided to the request and/or an equal preference based on a number of patrons 112 providing any consideration to the request. In operation 1130, a voting record may be stored in the profile of the initiating patron 112A and the different patron 112B. In operation 1132, disputes between patrons 112 and the entity 110 may be arbitrated by involving a neutral third party (e.g., using the dispute resolution module 204 of FIG. 2).

Figure 11C:
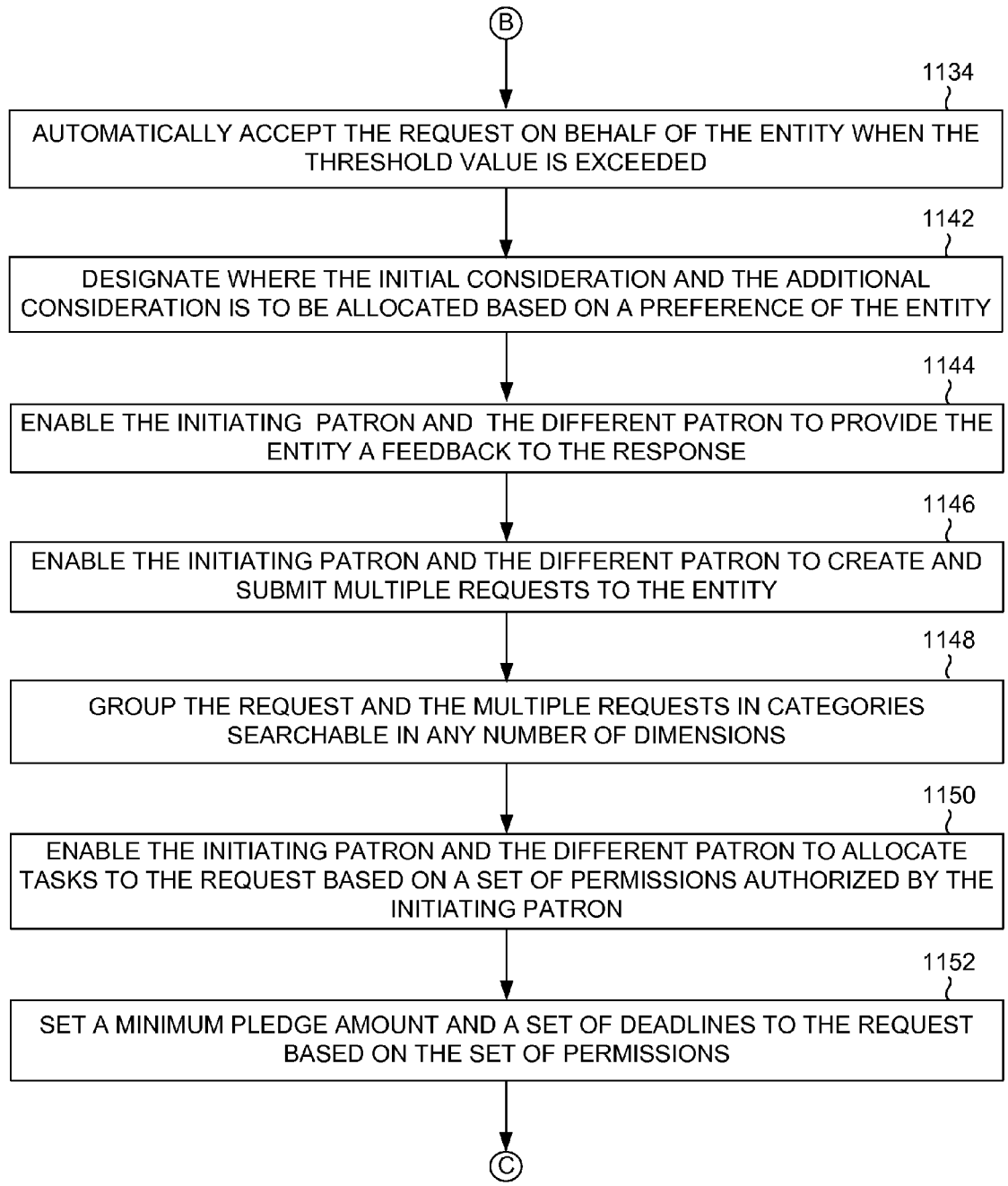
FIG. 11C is a continuation of the process flow of FIG. 11B illustrating additional processes, according to one embodiment.

FIG. 11C is a continuation of the process flow of FIG. 11B illustrating additional processes, according to one embodiment. In operation 1134, the request may be automatically accepted on behalf of the entity 110 when the threshold value is exceeded (e.g., using the response module 224 of FIG. 2). In operation 1142, it may be designated where the initial consideration and the additional consideration is to be allocated based on a preference of the entity 110 (e.g., using the payment module 212). In operation 1144, the initiating patron 112A and the different patron 112B may be enabled to provide the entity 110 a feedback to the response (e.g., using the feedback module 226). In operation 1146, the initiating patron 112A and the different patron 112B may be enabled to create and submit multiple requests to the entity 110.

In operation 1148, the request and the multiple requests may be grouped in categories searchable in any number of dimensions (e.g., using the classification module 220). In operation 1150, the initiating patron 112A and the different patron 112B may be enabled to allocate tasks to the request based on a set of permissions authorized by the initiating patron 112A. In operation 1152, a minimum pledge amount and a set of deadlines (e.g., may include a deadline to provide the additional consideration, a deadline to add additional requests when the initiating patron 112A provides for this ability, a deadline to accept the request, a deadline to fulfill the request after accepting and a deadline to verify the response of the request) may be set to the request based on the set of permissions.

Figure 11D:
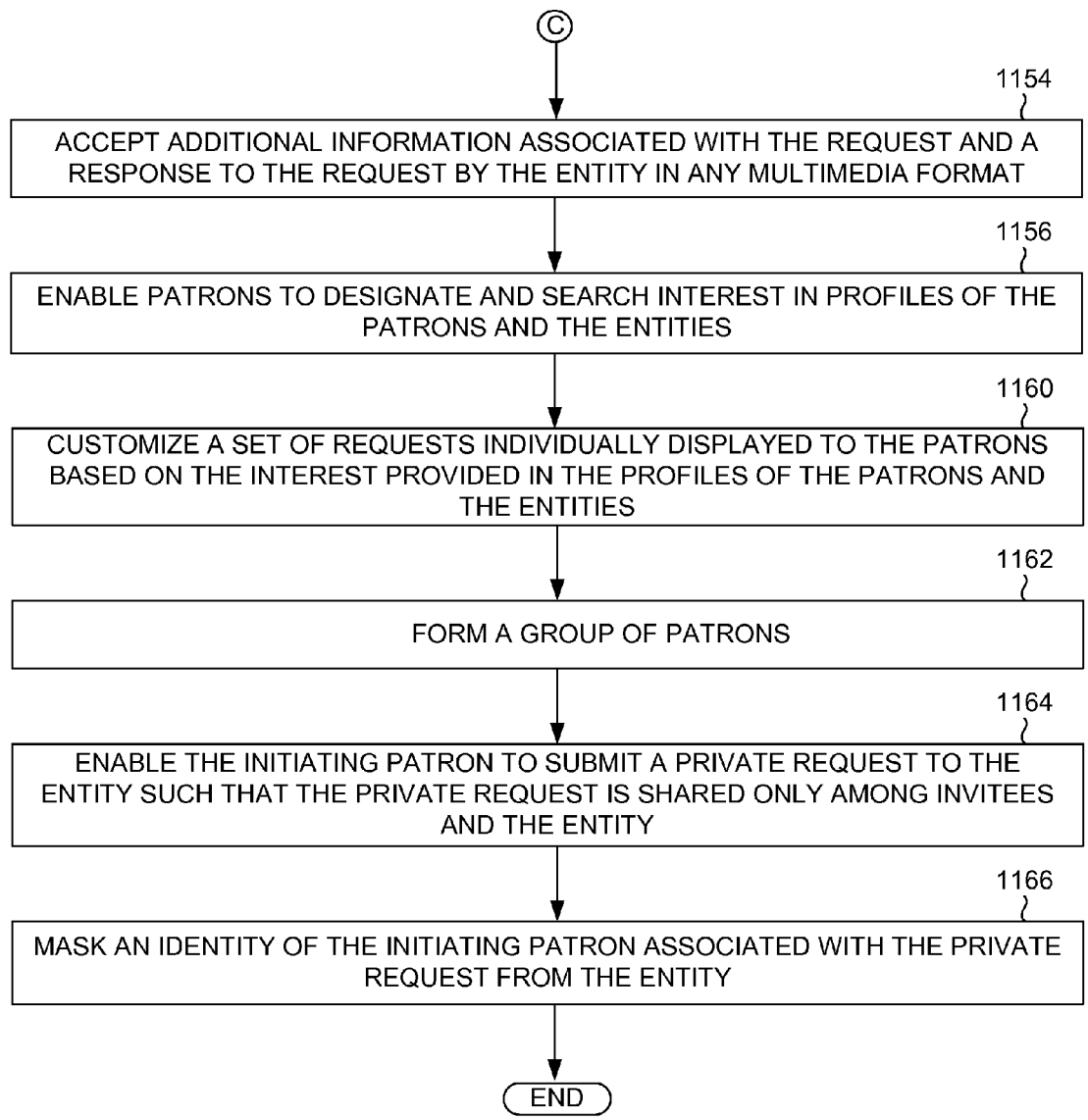
FIG. 11D is a continuation of the process flow of FIG. 11C illustrating additional processes, according to one embodiment.

FIG. 11D is a continuation of the process flow of FIG. 11C illustrating additional processes, according to one embodiment. In operation 1154, additional information associated with the request and a response to the request by the entity 110 may be accepted in any multimedia format (e.g., as illustrated in FIG. 6A). In operation 1156, patrons 112 may be enabled to designate and search interests in profiles of the patrons 112 and the entities 110 (e.g., using the search module 208).

In operation 1160, a set of requests individually displayed to the patrons 112 may be customized based on an interest provided in the profiles of the patrons 112 and the entities 110. In operation 1162, a group of patrons 112 (e.g., may be a private group accessible only by invitees and/or a public group that can be subscribed to by any user) may be formed.

In operation 1164, the initiating patron 112A may be enabled to submit a private request to the entity 110 such that the private request is shared only among invitees and the entity 110. In operation 1166, an identity of the initiating patron 112A associated with the private request may be masked from the entity 110.

In one or more embodiments, the initial consideration, the pooled consideration and the additional consideration may be a monetary unit, a credit, a point, a tangible asset, an intangible asset, a valuable good. The initiator device (e.g., initiator device 102 of FIG. 1), the supporter device (e.g., supporter device(s) 104 of FIG. 1), and the entity device (e.g., entity device 108 of FIG. 1) may be a mobile device, a cell phone, a computer, and a network enabled device. The consideration to the aggregation environment (e.g., aggregation environment 114 of FIG. 1) may be pooled through one or more of, but not limited to a patron billing system, a patron credit system, a patron money system, and a patron tangible good, a patron intangible good, and a patron valuable good collection.

Figure 12:
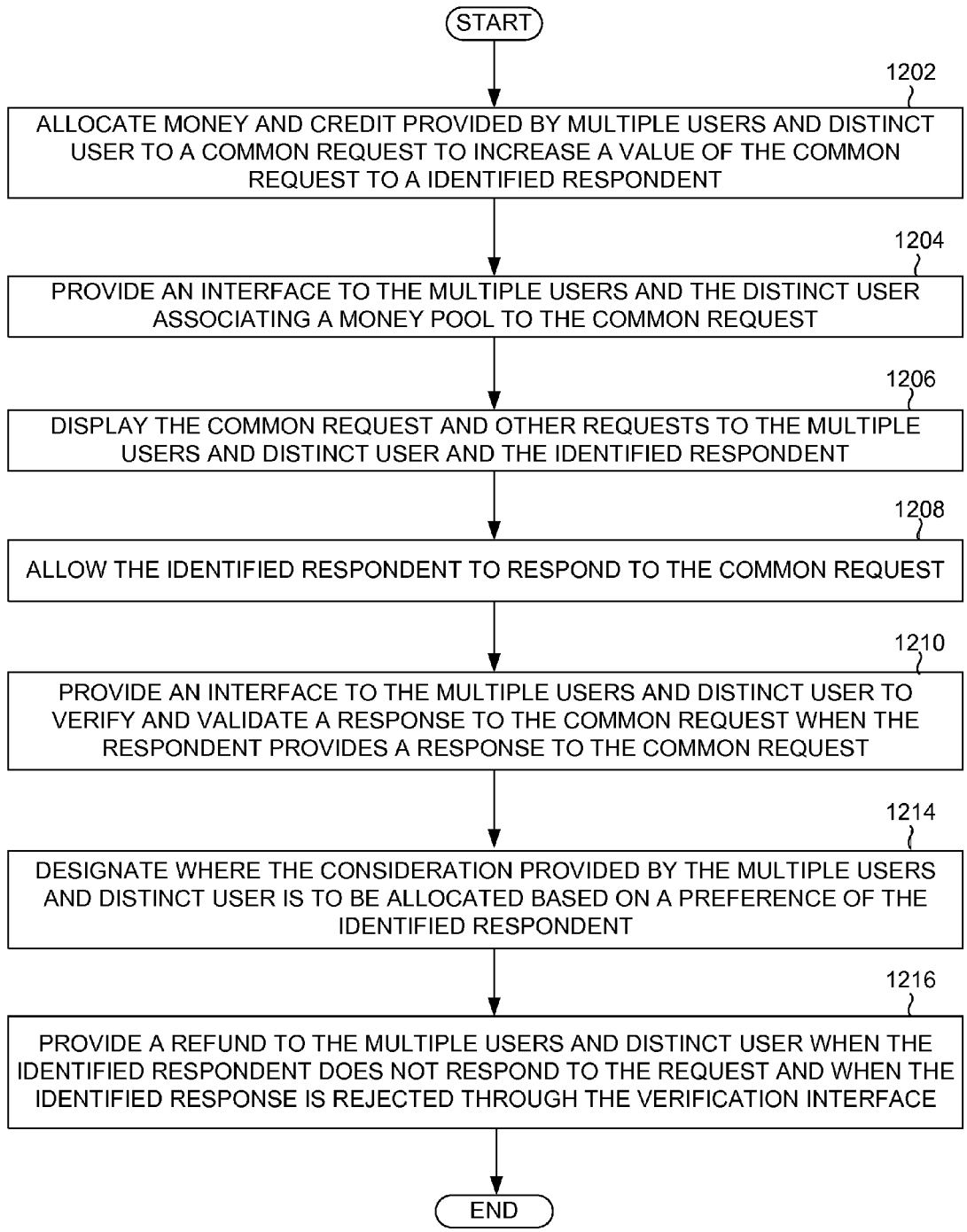
FIG. 12 is a process flow of allocating consideration provided by multiple users and distinct user to a common request to increase a value of the request to an identified respondent according to one embodiment.

FIG. 12 is a process flow of allocating consideration provided by multiple users and distinct user to a common request to increase a value of the request to an identified respondent, according to one embodiment. In operation 1202, a money or a credit provided by multiple users and distinct user may be allocated to the common request by pooling of the money and the credit to the common request to increase the value of the request to the identified respondent (e.g., using the pledge module 218 of FIG. 2). In operation 1204, an interface is provided to the multiple users and distinct user associating a money pool to the common request. The money pool may be a pool of the money and the credit. In operation 1206, the common request and other requests may be displayed to the multiple users and distinct user and the identified respondent (e.g., using the notification and communication module 228 of FIG. 2). In operation 1208, the identified respondent can respond to the common request (e.g., using the response module 224 of FIG. 2). In operation 1210, an interface (e.g., the verification interface 202 of FIG. 2) may be provided to the multiple users and distinct user to verify and validate a response to the common request when the identified respondent provides a response to the common request. In operation 1214, it may be designated where the money and the credit provided by the multiple users and distinct user is to be allocated based on a preference of the identified respondent (e.g., using the payment module 212 of FIG. 2). In operation 1216, a refund may be provided to the multiple users and distinct user (e.g., using the payment module 212 of FIG. 2)

when the identified respondent does not respond to the request and/or when the response is rejected by the multiple users and distinct user through the verification interface 202.

Figure 13:
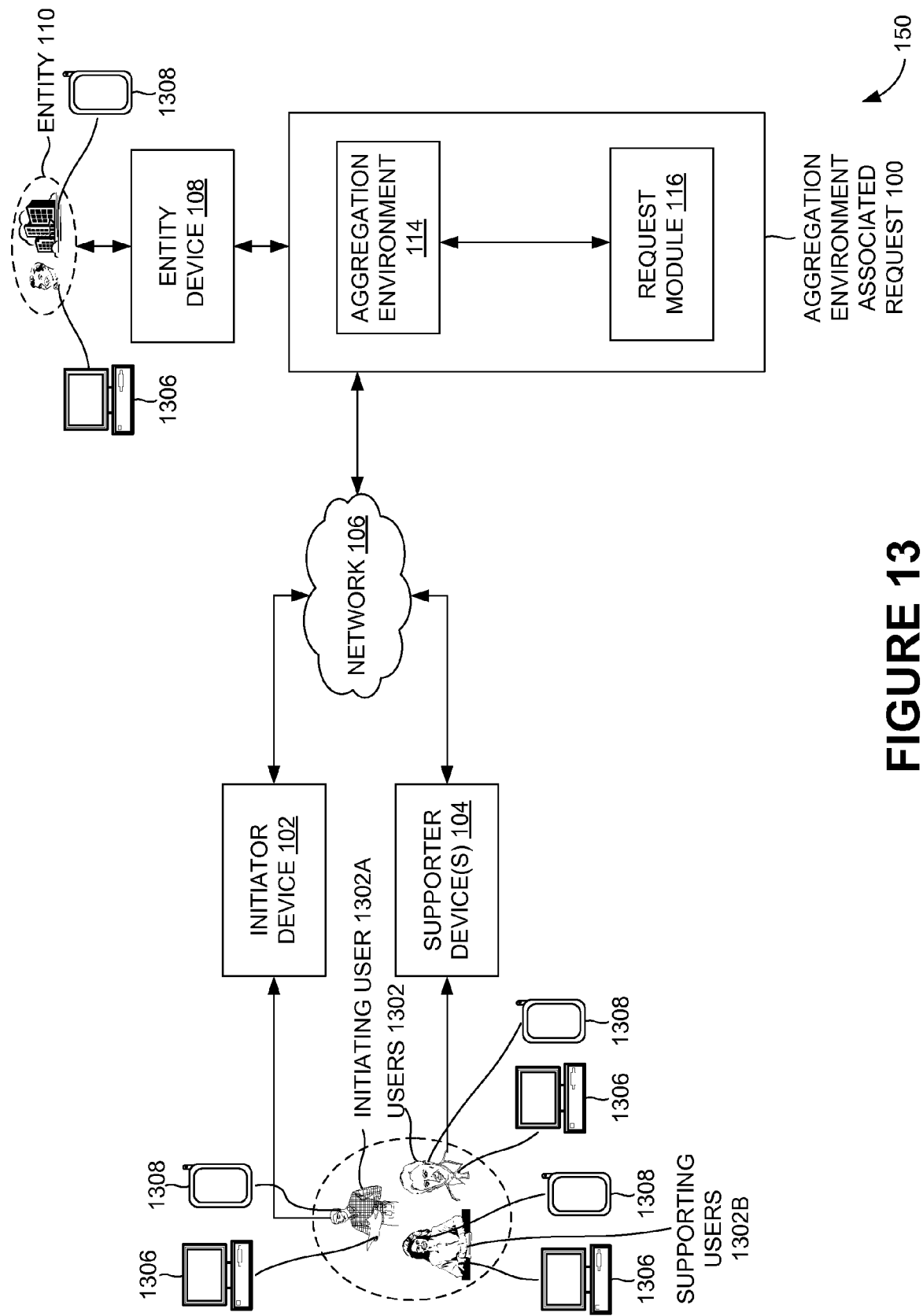
FIG. 13 is a system view of patrons communicating with an entity through a computing and/or a hand held device in a request aggregation environment, according to one embodiment.

FIG. 13 is a system view of patrons communicating with the entity 110 through a computing and/or a hand held device in the aggregation environment associated request 100, according to one embodiment. The aggregation environment associated request 100 (e.g., a network, a social network, a community, a platform, etc.) may manage pooled consideration (e.g., the aggregation environment 114, money pool, gifts, etc.) associated with a set of requests generated by users 1302. to a set of entities (e.g., the entity 110). For example, the users may be an initiating user 1302A who have submitted their request to the entity 110 along with an initial consideration (e.g., a money, a credit, a point, etc., submitted by the initiating patron 112A) and a supporting user 1302B who have provided a supporting consideration in the aggregation environment associated request 100.

The users 1302 may be followers, legal entities, observers, fans, associates, employees, and/or relatives of the entity 110 who desire to communicate a request to the entity 110. A computing device such as a computer 1306 (e.g., desktops, laptops, palm tops, etc) and/or a handheld device 1308 (e.g., a mobile device, a cell phone, a network enabled device, etc) connected to a network (e.g., Internet, wireless Internet, WAN, LAN, Bluetooth, WiFi, telecommunications, radio frequency and/or infrared network, etc) may be used by the users 1302 and the entity 110 for communication. The communication may be generation of request, transactions (e.g., allocating consideration), contact validation, alerts, responding to requests, etc. The initiating user 1302A may be the first user to define a request and/or an initial consideration to the entity 110, and/or may grant a set of permissions (e.g., as an authorized user 1302) to the supporting users 1302B associated with the request to the entity 110. The users 1302 and/or entity 110 may be enabled to communicate and view the request aggregation environment through a user interface view provided thereof.

FIG. 14 is a schematic view illustrating pooling of consideration 1400 by patrons 112 (e.g., the initiating patron 112A, the different patron 112B), according to one or more embodiments. In one or more embodiments, consideration 1400 may be anything that has value. For example, consideration 1400 may be monetary, gifts, etc. In one or more embodiments, the consideration 1400 may be pooled from various sources for stimulating the entity 110 based on the consideration. In one or more embodiments, as illustrated in FIG. 14, the considerations 1400 may be from one or more sources such as a monetary unit 1414, credits 1416, points 1404, tangible assets 1406, intangible assets 1408, a valuable good 1410 and corporate donations 1412. In one embodiment, the monetary unit 1414 being one of the source for the consideration 1400 may provide by cellular billing 1418 (e.g., talk time value), credit card 1470, and cash 1420. Also, in one embodiment, the credit 1416 purchased by the users is another source of the consideration 1400.

The points 1404 purchased or earned by the users may be part of the consideration 1400. The tangible assets 1406 may also provide an input to the consideration. The tangible assets 1406 may include but not limited to a house 1430 and boat 1440. In one embodiment, the income from house 1430 and boat 1440 may be provided to improve consideration. In alternate embodiment, the house 1430 and the boat 1440 itself may be provided as a part of consideration 1400 (e.g., gift). Also, the intangible assets 1408 may be provided as a part of consideration. In example embodiment, the intangible asset 1408 as illustrated may be an intellectual property 1442. The patrons 112 may be enabled to assign their intellectual property (e.g., patents, trademarks, copyrights) as a consideration to the consideration pool 1400 (or to the entity). Also, valuable good 1410, for example, jewelry 1450 and watch 1452 may be provided as a part of consideration 1400. Furthermore, donations from groups, networking sites and corporate donation 1412 may be used for pooling the consideration.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., Application Specific Integrated Circuitry (ASIC) and/or in Digital Signal Processor (DSP) circuitry).

For example, the aggregation environment 114, the request module 116, the validation module 200, the verification interface 202, the dispute resolution module 204, the presentation module 206, the search module 208, the deadline module 210, the payment module (include payment refund) 212, the pledge module 218, the classification module 220, the public/private module 222, the response module 224, the feedback module 226, the notification and communication module 228, and/or other modules of FIGS. 1-14 may be enabled using an aggregation environment circuit, a request circuit, a validation circuit, a verification circuit, a dispute resolution circuit, a presentation circuit, a search circuit, a deadline circuit, a payment (include payment refund, fee) circuit, a pledge circuit, a classification circuit, a public/private circuit, a response circuit, a feedback circuit, a notification and communication circuit and/or other circuits using one or more of the technologies described herein.

In addition, it will be appreciated that the various operations, processes, and methods disclosed herein may be embodied in a machine-readable medium and/or a machine accessible medium compatible with a data processing system (e.g., a mobile device, a computer system, a network enabled device), and may be performed in any order.

The modules in the figures are shown as distinct and communicating with only a few specific module and not others. The modules may be merged with each other, may perform overlapping functions, and may communicate with other modules not shown to be connected in the Figures. Accordingly, the specification and drawings are to be regarded in an illustrative rather than a restrictive sense.

What is claimed is:
1. A method, comprising:
generating, through a request module implemented on a data processing system, a request to an entity device related to an entity based on a set of attributes provided by an initiating patron of the entity using a processor of an initiator device;
allocating, through the request module, an initial consideration from the initiating patron associated with the initiator device to the request;
allocating, through the request module, an additional consideration to the request through a different patron using a processor of a supporter device;
determining, at an aggregation environment, the initial consideration and the additional consideration through at least one account funded through a subscription service and a trusted financial intermediary;

aggregating the consideration of the initiating patron and the additional consideration of the different patron through the aggregation environment with the request to increase a value of the request to the entity device in order to increase a possibility of the entity to respond to the request using the entity device;

generating, through the request module, a notification to the entity associated with the entity device when the initial consideration and the additional consideration exceed a threshold value preferred by the entity;

processing, through the request module, a response of the entity through the entity device to the request;

providing, through the request module, a verification interface to the initiating patron at the initiator device and the different patron at the supporter device based on an initiating patron specified criteria prior to the response of the entity; and allocating, via a processor, at least one of: monetary data and credit data related to the initial consideration and the additional consideration to the entity device related to the entity after a fulfillment of the request thereto based on a result of verification through the verification interface.

2. The method of claim 1, further comprising:
at least one of alerting and updating the entity device with a size of the aggregation environment; and
receiving an interest as an acceptance by the entity through the entity device after consideration of the size of the aggregation environment.

3. The method of claim 1,
wherein the consideration is at least one of a monetary unit, a credit, a point, a tangible asset, an intangible asset, a valuable good, and
wherein at least one of the initiator device, the supporter device, and the entity device is one of a mobile device, a computer, and a network enabled device.

4. The method of claim 1, wherein the aggregation environment is at least one of a money pool, a credit pool, a point pool, a pool of valuable goods, a pool of tangible goods, and a pool of intangible goods.

5. The method of claim 1, further comprising:
contributing to the aggregation environment using at least one of a patron billing system, a patron credit system, a patron money system, a patron point system, a patron tangible good, a patron intangible good and a patron valuable goods collection.

6. The method of claim 1, wherein the initiator device, the supporter device, the entity device and the aggregation environment are communicatively coupled to each other through a computer network.

7. The method of claim 1, further comprising:
setting the initiating patron specified criteria as at least one of a weighted preference based on consideration provided to the request, and an equal preference based on a number of patrons providing consideration to the request;
storing a voting record in the profile of at least one of the initiating patron and the different patron;
arbitrating disputes between patrons and the entity by involving a neutral third party associated with a data processing device;
automatically accepting the request on behalf of the entity when the threshold value is exceeded;
designating where the initial consideration and the additional consideration is to be allocated based on a preference of the entity; and
enabling the initiating patron and the different patron to provide the entity a feedback to the response.

8. The method of claim 1,
wherein the entity is at least one an individual, a group, a business, a celebrity, and an organization, and
wherein the request is at least one of a performance request, a task request, a job request, an article request, a charitable request, an interview, a question to answer, an invitation, a self promotion, a donation request, a mission, and an altruistic request.

9. The method of claim 1, further comprising:
enabling the initiating patron and the different patron to create and submit multiple requests to the entity;
grouping the request and the multiple requests in categories searchable in number of dimensions;
enabling the initiating patron and the different patron to allocate tasks to the request based on a set of permissions authorized by the initiating patron;
setting a minimum pledge amount and a set of deadlines to the request based on the set of permissions; and
accepting additional information associated with the request and the response to the request by the entity in a multimedia format.

10. The method of claim 9, wherein the set of deadlines includes at least one of a deadline to provide the additional consideration, a deadline to add additional tasks to the request, a deadline to accept the request, a deadline to fulfill the request after accepting, and a deadline to verify the response of the request.

11. The method of claim 1, further comprising:
enabling patrons to designate and search at least one interest in profiles of the patrons and other entities;
customizing a set of requests individually displayed to the patrons based on the at least one interest provided in the profiles of the patrons;
forming a group of patrons, wherein the group being at least one of a private group accessible only by invitees and a public group that can be subscribed to by any user;
enabling the initiating patron to submit a private request to the entity such the private request is shared only among invitees and the entity; and
masking an identity of the initiating patron associated with the request from the entity.

12. A method, comprising:
generating, through a request module implemented on a data processing system, a request to an entity device related to an entity based on a set of attributes provided by an initiating patron of the entity using a processor of an initiator device, wherein the entity is at least one an individual, a group, a business, a celebrity, and an organization, and wherein the request is at least one of a performance request, a task request, a job request, an article request, a charitable request, an interview, a question to answer, an invitation, a self promotion, a donation request, a mission, and an altruistic request;
allocating, through the request module, initial consideration to the entity in a request aggregation environment;
enabling a different patron at a supporter device to contribute an additional consideration to the entity in the request aggregation environment using a processor of the supporter device; and
aggregating the initial consideration and the additional consideration with the request in the request aggregation environment, the initial consideration and the additional consideration are at least one of monetary units, credits, points, tangible assets, intangible assets, and valuable goods, at least one of the initiator device, the supporter device and the entity device being one of a mobile device, a computer and a network enabled device, and the aggregated initial consideration and the additional consideration being pooled through at least one of a user billing system, a user credit system, a user money system, a user point system, a user tangible good, a user intangible good and a user valuable good collection.

13. A system comprising:
an aggregation environment to manage a pooled consideration associated with each one of a set of requests generated by users to at least one of a set of entities;
an initiator device to generate an initial consideration associated with at least one of the set of requests;
a supporter device to provide a supporting consideration to the at least one of the set of requests, in addition to the initial consideration; and
an entity device to allow at least one of the set of entities to respond to at least one of the set of requests.
wherein the initial consideration and the supporting consideration are at least one of monetary units, credits, points, tangible assets, intangible assets, and valuable goods,
wherein at least one of the initiator device, the supporter device, and the entity device is one of a mobile device, a computer, and a network enabled device, and
wherein the aggregation environment is configured to pool the initial consideration and the supporting consideration through at least one of a user billing system, a user credit system, a user money system, a user point system, a user tangible good, a user intangible good and a user valuable good collection.

14. The system of claim 13,
wherein the initiator device, the supporter device, the entity device and the aggregation environment are communicatively coupled to each other through a computer network.

15. The system of claim 13, further comprising:
a validation module of the request aggregation environment to determine whether a contact information of the entity provided through the initiator device and the supporter device references to a verified contact data, and to validate the contact information with the entity when the verified contact data is absent; and
a notification and communication module of the request aggregation environment to communicate the request to the entity based on at least one of the contact information and the verified contact data.

16. The system of claim 15, further comprising:
a central database of the request aggregation environment to store information including the set of requests, a set of user profiles, and a set of contact data as the verified contact data; and
a pledge module of the request aggregation environment to allocate the initial consideration and the additional consideration through at least one account funded through a subscription service and a trusted financial intermediary.

17. The system of claim 16, further comprising:
the notification and communication module of the request aggregation environment to generate a notification to the entity of the request when the initial consideration and the additional consideration reach an acceptable value set by the entity, and to process a response of the entity to the request;
a verification interface of the request aggregation environment to verify the response of the entity based on an initiating user specified criteria provided prior to the response of the entity to the request, wherein the criteria is at least one of a weighted preference based on consideration provided to the request, an equal preference based on a number of users providing any consideration to the request, and a verification threshold set by the initiating user;
a private module to enable generation of a private request shared only with invitees and the entity; and
a public module to enable generation of a public request shared with all users of the request aggregation environment.

18. The system of claim 17, further comprising:
a dispute resolution module of the request aggregation environment to assign a neutral third party to arbitrate disputes between users and the entity;
a response module of the request aggregation environment to allow the entity to respond to the request, and to automatically accept the request on behalf of the entity when a threshold value preferred by the entity is exceeded; and
a payment module of the request aggregation environment to allocate the initial consideration and the additional consideration to the entity, and to issue a refund to the users when at least one of the entity does not respond to the request and the response is rejected through the verification interface.

19. The system of claim 13,
wherein the entity is at least one an individual, a group, a business, a celebrity, and an organization, and
wherein the request is at least one of a performance request, a task request, a job request, an article request, a charitable request, an interview, a question to answer, an invitation, a self promotion, a donation request, a mission, and an altruistic request.

20. A method, comprising:
Pooling, via a processor, at least one of a money and a credit provided by at least one of a multiple users and a distinct user to a common request to increase a value of the request to an identified respondent;
providing an interface to the multiple users and the distinct user associating a money pool to the common request, wherein the money pool is a pool of at least one of the money and the credit;
displaying at least one of the common request and the other requests to at least one of the multiple users, the distinct user and the identified respondent;
allowing the identified respondent to respond to the common request through the interface;
providing a verification interface to the multiple users and the distinct user to verify and to validate a response to the common request from the identified respondent;
designating where the money and the credit provided by the multiple users and the distinct user is to be allocated based on a preference of the identified respondent; and
providing a refund to the multiple users and the distinct user when at least one of: the identified respondent does not respond to the request and when the response is rejected through the verification interface.

21. The method of claim 20, wherein devices associated with the one of the multiple users and the distinct user and the identified respondent are communicatively coupled to each other through a computer network.

* * * * *